US011258337B2

United States Patent
Yoshida et al.

(10) Patent No.: US 11,258,337 B2
(45) Date of Patent: Feb. 22, 2022

(54) ELECTRIC CONDUCTOR INSERTION DEVICE

(71) Applicant: HONDA MOTOR CO., LTD., Tokyo (JP)

(72) Inventors: Takashi Yoshida, Tochigi-ken (JP); Takao Inoue, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 253 days.

(21) Appl. No.: 16/554,772

(22) Filed: Aug. 29, 2019

(65) Prior Publication Data

US 2020/0076281 A1  Mar. 5, 2020

(30) Foreign Application Priority Data

Sep. 4, 2018 (JP) .............................. JP2018-165087

(51) Int. Cl.
*H02K 15/02* (2006.01)
*B21D 28/32* (2006.01)

(52) U.S. Cl.
CPC ........... *H02K 15/024* (2013.01); *B21D 28/32* (2013.01)

(58) Field of Classification Search
CPC .............................. B21D 28/32; H02K 15/024
See application file for complete search history.

(56) References Cited

U.S. PATENT DOCUMENTS

| 4,186,478 A * | 2/1980 | Hamane ............... H02K 15/068 29/564.1 |
| 6,530,140 B2 * | 3/2003 | Maeda ............... H02K 15/0428 242/432 |
| 6,557,239 B2 * | 5/2003 | Takahashi .......... H02K 15/0428 29/596 |
| 6,995,492 B1 * | 2/2006 | Kouda ..................... H02K 3/28 310/179 |
| 7,788,790 B2 * | 9/2010 | Neet ...................... H02K 3/345 29/596 |
| 10,951,096 B2 * | 3/2021 | Mizushima ........ H02K 15/0087 |
| 2001/0013167 A1 * | 8/2001 | Maeda ............... H02K 15/0428 29/596 |
| 2002/0053126 A1 * | 5/2002 | Maeda ............... H02K 15/0414 29/596 |
| 2003/0048022 A1 * | 3/2003 | Nagai ..................... H02K 3/51 310/215 |
| 2014/0013592 A1 | 1/2014 | Yoshida et al. |

FOREIGN PATENT DOCUMENTS

JP    5841017    1/2016

\* cited by examiner

*Primary Examiner* — Carl J Arbes
(74) *Attorney, Agent, or Firm* — Amin, Turocy & Watson, LLP

(57) ABSTRACT

A guide member includes a first diametrically directed side guide section and a second diametrically directed side guide section formed by bending a single member at a bent portion. The first diametrically directed side guide section guides predetermined portions of electric conductors on a diametrically directed side of a slot. Further, the second diametrically directed side guide section guides predetermined portions of the electric conductors on a diametrically directed side of another slot adjacent to the slot. The bent portion is supported by a supporting body.

7 Claims, 17 Drawing Sheets

(INSIDE) ← → (OUTSIDE)

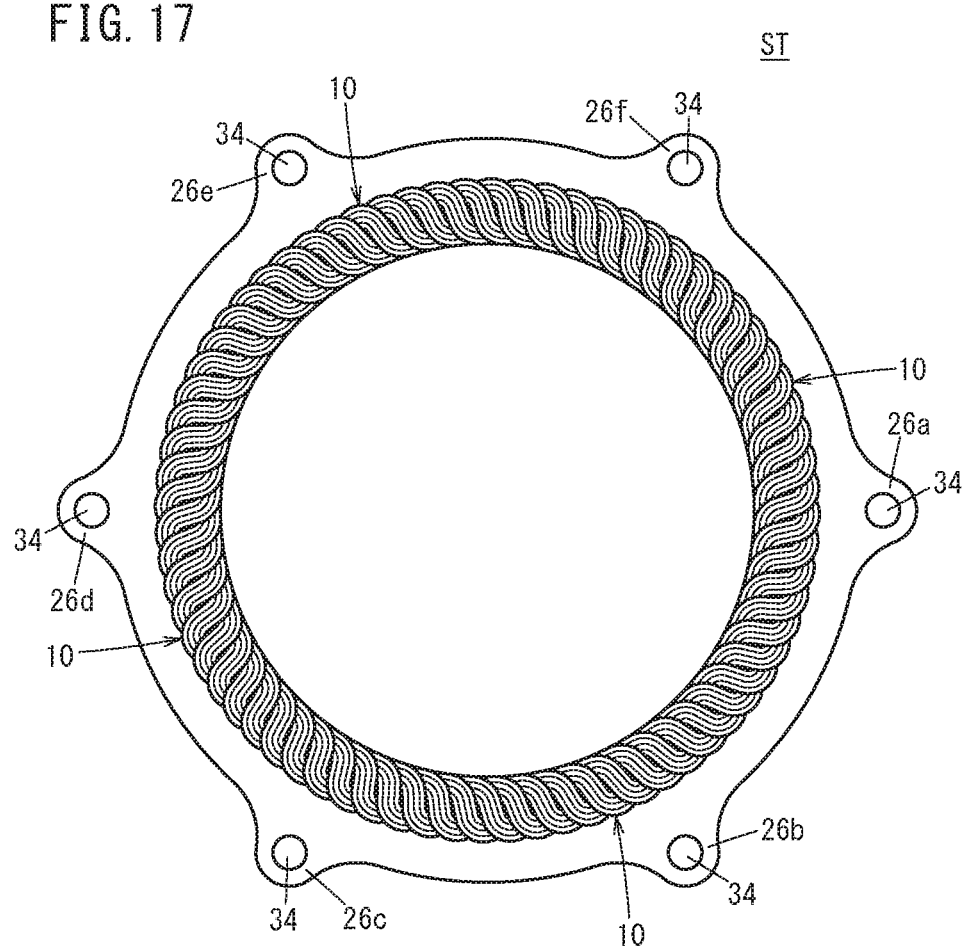

ELECTRIC CONDUCTOR INSERTION DEVICE

CROSS-REFERENCE TO RELATED APPLICATION

This application is based upon and claims the benefit of priority from Japanese Patent Application No. 2018-165087 filed on Sep. 4, 2018, the contents of which are incorporated herein by reference.

BACKGROUND OF THE INVENTION

Field of the Invention

The present invention relates to an electric conductor insertion device for inserting predetermined portions of electric conductors with respect to slots that are formed in a stator core.

Description of the Related Art

As a stator that constitutes a rotary electric machine such as a motor or a generator or the like, a stator is known that includes a stator core formed with slots therein, and electric conductors (hereinafter referred to as "segments") each having two legs and a curved portion and formed in a substantially U-shape. With such a stator, the legs are inserted into the slots, and furthermore, the legs that are exposed from the slots are joined together and electrically connected. Moreover, insulating paper is accommodated in advance in the slots, and the insulating paper is interposed between inner walls of the slots and the legs to thereby prevent the occurrence of short circuiting between the segments and the stator core.

When the legs of the segments are inserted into the slots, the insulating paper may be pushed out from the slots and in certain cases may become damaged if the insulating paper becomes caught on the legs. If such a situation occurs, it becomes a cause of short circuiting occurring between the segments and the stator core.

Thus, in Japanese Patent No. 5841017, the applicants of the present invention have proposed an insertion device equipped with two first expansion plates and two second expansion plates, each of which is capable of guiding the legs while they are being inserted into the slots and while pressing the insulating paper. More specifically, the two first expansion plates and the two second expansion plates guide the legs on inner surfaces while pressing the insulating paper on outer surface sides. Consequently, when the legs of the segments are inserted into the slots, the insulating paper can be prevented from becoming caught on the legs.

More specifically, two of the first expansion plates and one of the second expansion plates are supported by guide members that are disposed on an outer circumferential side of the stator core, whereas the remaining one of the second expansion plates is supported by an inner circumferential guide disposed on an inner circumferential side of the stator core. In addition, the two first expansion plates guide the legs on two elongate sides of the slots that extend along diametrical directions of the stator core, and the two second expansion plates guide the legs on two short sides of the slots that extend along the circumferential direction of the stator core.

SUMMARY OF THE INVENTION

In the insertion device described in Japanese Patent No. 5841017, the two first expansion plates are positioned and fixed at a distal end side facing toward the stator core of the guide members that are displaced in directions to approach toward or separate away from the stator core. Such positioning and fixing is carried out through bolts.

In this instance, the area of the openings of the slots is small, and accordingly, the distance between the adjacent first expansion plates is also small. For this reason, as the bolts, it is necessary for minimally sized bolts to be selected. Further, when the first expansion plates are attached to the guide members, or when replacing or exchanging a damaged first expansion plate with a new product or the like, it is necessary to screw such minimally sized bolts within a narrow space. However, it is not an easy operation to perform screwing of such very small bolts. Additionally, in such a narrow space, it is difficult for an operator to insert his or her fingers in order to insert such minimally sized bolts into the bolt holes, or to perform screwing of the bolts.

In order to avoid this, it may be considered to bond the first expansion plates to the guide members through an adhesive. However, in this case, it is complicated to maintain such positioning and fixing until the adhesive is cured. Further, it is difficult to obtain sufficient bonding strength, and there is a concern that the first expansion plates may drop off from the guide members. Furthermore, the manufacturing time becomes prolonged, and the accuracy thereof is not stable.

A principal object of the present invention is to provide an electric conductor insertion device, in which it is easy to attach and detach a guide member for guiding predetermined portions of the electric conductors to and from a supporting body.

In order to realize the above-described objects, according to a first aspect of the present invention, there is provided an electric conductor insertion device configured to insert predetermined portions of electric conductors with respect to slots which are formed in plurality in a stator core, together with being formed in linear shapes including diametrically directed sides extending along diametrical directions of the stator core, and circumferential sides extending along a circumferential direction of the stator core, and in which insulating papers are respectively arranged, the electric conductor insertion device comprising:

a guide member configured to guide the predetermined portions of the electric conductors into the slots; and a supporting body configured to support the guide member;

wherein, by a single member being bent at a bent portion, the guide member includes a first diametrically directed side guide section adapted to guide the predetermined portions of the electric conductors on a diametrically directed side of a first slot, and a second diametrically directed side guide section adapted to guide the predetermined portions of the electric conductors on a diametrically directed side of a second slot adjacent to the first slot, together with the first diametrically directed side guide section and the second diametrically directed side guide section forming an inverted V-shape with the bent portion forming an apex thereof, and the bent portion is supported by the supporting body, wherein the first diametrically directed side guide section, at a time of approaching toward the first slot, presses the insulating paper inside the first slot toward an inner wall side of the diametrically directed sides of the first slot, and the second diametrically directed side guide section, at a time of approaching toward the second slot, presses the insulating paper inside the second slot toward an inner wall side of the diametrically directed sides of the second slot.

In accordance with such a configuration, the guide member can be a single member, and is capable of being supported on the supporting body without the use of bolts, an adhesive, or the like. Accordingly, the operation of attaching and detaching the guide member to and from the supporting body is facilitated. Therefore, when it becomes necessary to exchange or replace the guide member, such a replacement operation can be performed both easily and quickly.

The guide member preferably further includes an outer circumferentially directed side guide section adapted to guide the predetermined portions of the electric conductors on a circumferentially directed side of an outer circumferential side of the second slot. In this case, because the insulating paper that is inserted into the slots and positioned in the vicinity of the circumferentially directed side of the outer circumferential side is pressed by the guide member, it is possible to effectively prevent the insulating paper from falling out from the slots.

There is preferably further provided a second supporting body, which includes an inner circumferentially directed side guide section adapted to guide the predetermined portions of the electric conductors on a circumferentially directed side of an inner circumference of the second slot. In accordance with this feature, the insulating paper, which is inserted into the slots and positioned in the vicinity of the circumferentially directed side of the inner circumferential side, is pressed by the guide member. Accordingly, it is possible to more effectively prevent the insulating paper from falling out from the slots.

A first engagement part is preferably provided on the second supporting body, and a second engagement part that engages with the first engagement part is preferably provided on the supporting body. Furthermore, a supporting body displacement mechanism may be provided, which is adapted to cause the second supporting body and the supporting body, which are connected together mutually by engagement of the first engagement part and the second engagement part, to be displaced together integrally. In accordance with such features, both the supporting body and the second supporting body, and more specifically, the guide member and the inner circumferentially directed side guide section are capable of being simultaneously displaced by one individual supporting body displacement mechanism.

The supporting body may be formed in an inverted V-shape, and may include a bent portion mounting member on which the bent portion of the guide member is mounted. By being mounted in this manner, it becomes easy for the guide member to be supported on the supporting body, or stated otherwise, positioning of the guide member is facilitated.

Further, there is preferably used a member including a bent portion sandwiching part adapted to sandwich, together with the bent portion mounting member, the bent portion that is mounted on the bent portion mounting member. By being sandwiched in this manner, the guide member is positioned and fixed on the supporting body. Therefore, since the positions of the electric conductors and the slots coincide with one another accurately, it becomes easy to guide the predetermined portions of the electric conductors into the slots. Further, the guide member is prevented from separating away from the supporting body.

An outer circumferentially directed side guide section mounting member on which the outer circumferentially directed side guide section is mounted is preferably provided on the supporting body. In addition, a member may be used that includes an outer circumferentially directed side guide section sandwiching part adapted to sandwich, together with the outer circumferentially directed side guide section mounting member, the outer circumferentially directed side guide section that is mounted on the outer circumferentially directed side guide section mounting member. In accordance with these features, the guide member is securely supported, and is positioned and fixed on the supporting body.

In this case, the bent portion sandwiching part and the outer circumferentially directed side guide section sandwiching part are preferably provided integrally on a single member. This is because the number of parts can be reduced, and along therewith, attachment and detachment of the member to and from the supporting body is made easier than using a plurality of members.

According to the present invention, the guide member that guides the predetermined portions of the electric conductors has an inverted V-shape with the bent portion, which is a boundary between the first diametrically directed side guide section and the second diametrically directed side guide section, forming an apex thereof, and together therewith, the insulating paper inside the slots is pressed by the first diametrically directed side guide section and the second diametrically directed side guide section toward the inner wall sides of the slots. Therefore, the guide member can be formed as a single member, and is capable of being supported on the supporting body without the use of bolts, an adhesive, or the like. As a result, the operation of attaching or detaching the guide member to and from the supporting body is facilitated.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 17 is a schematic plan view of the stator which is constituted by inserting the segments into the slots of the stator core.

DESCRIPTION OF THE PREFERRED EMBODIMENTS

Preferred embodiments of an electric conductor insertion device according to the present invention will be presented and described in detail below with reference to the accompanying drawings. Hereinafter, the electric conductor insertion device may also be referred to as a "leg insertion device".

Figure 1:
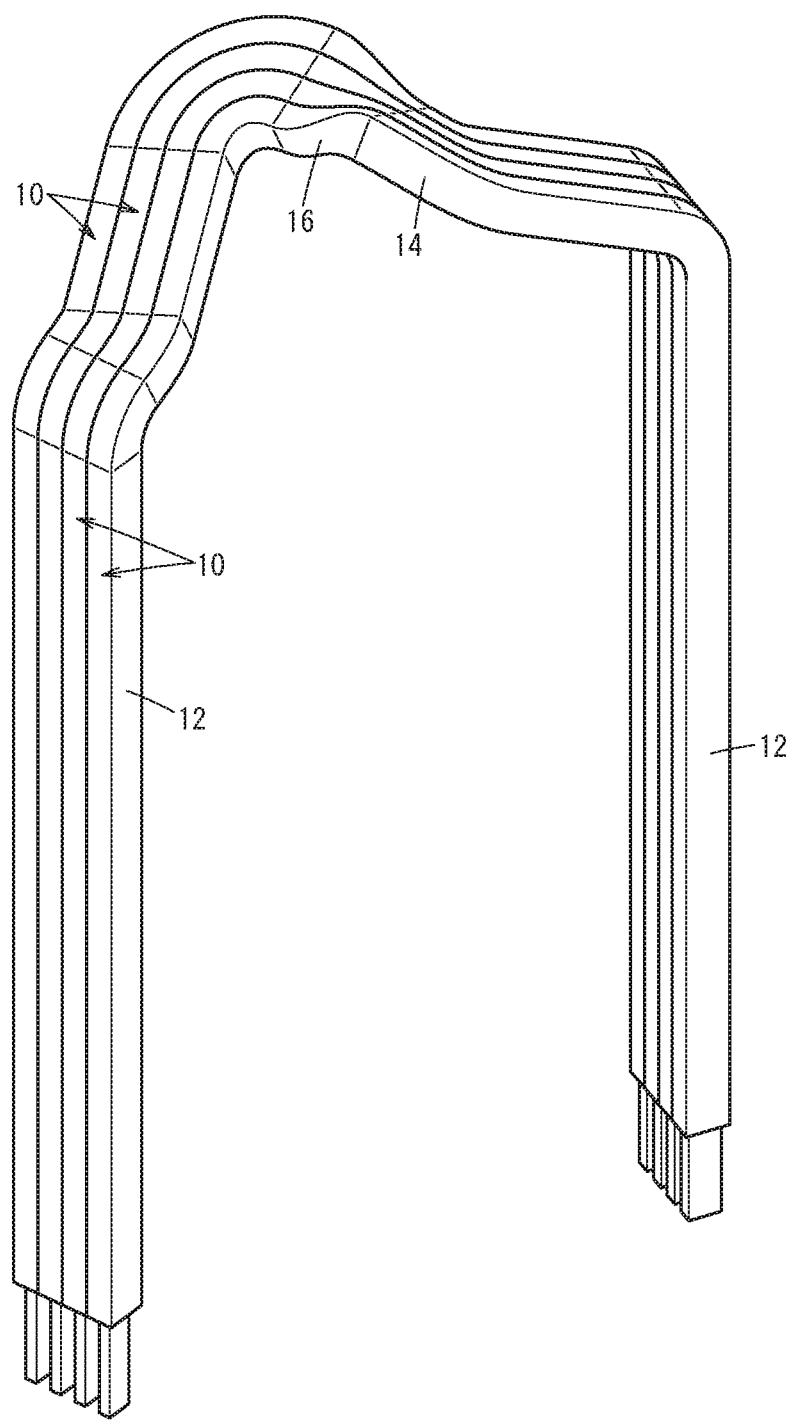
FIG. 1 is a schematic overall perspective view of electric conductors (segments) that form an electromagnetic coil for a stator.

First, the segments 10 (electric conductors) shown in FIG. 1 will be described. Each of the segments 10 includes two legs 12, and a turn portion 14 interposed between the legs 12. The turn portion 14 is curved from one leg 12 toward the other leg 12, and therefore, each of the segments 10 has a substantially U-shaped configuration.

A meandering crank portion 16 is formed on the turn portion 14. Due to such a crank portion 16, a deviation occurs in the segments 10 in a direction along the diametrical direction of the stator core.

Figure 2:
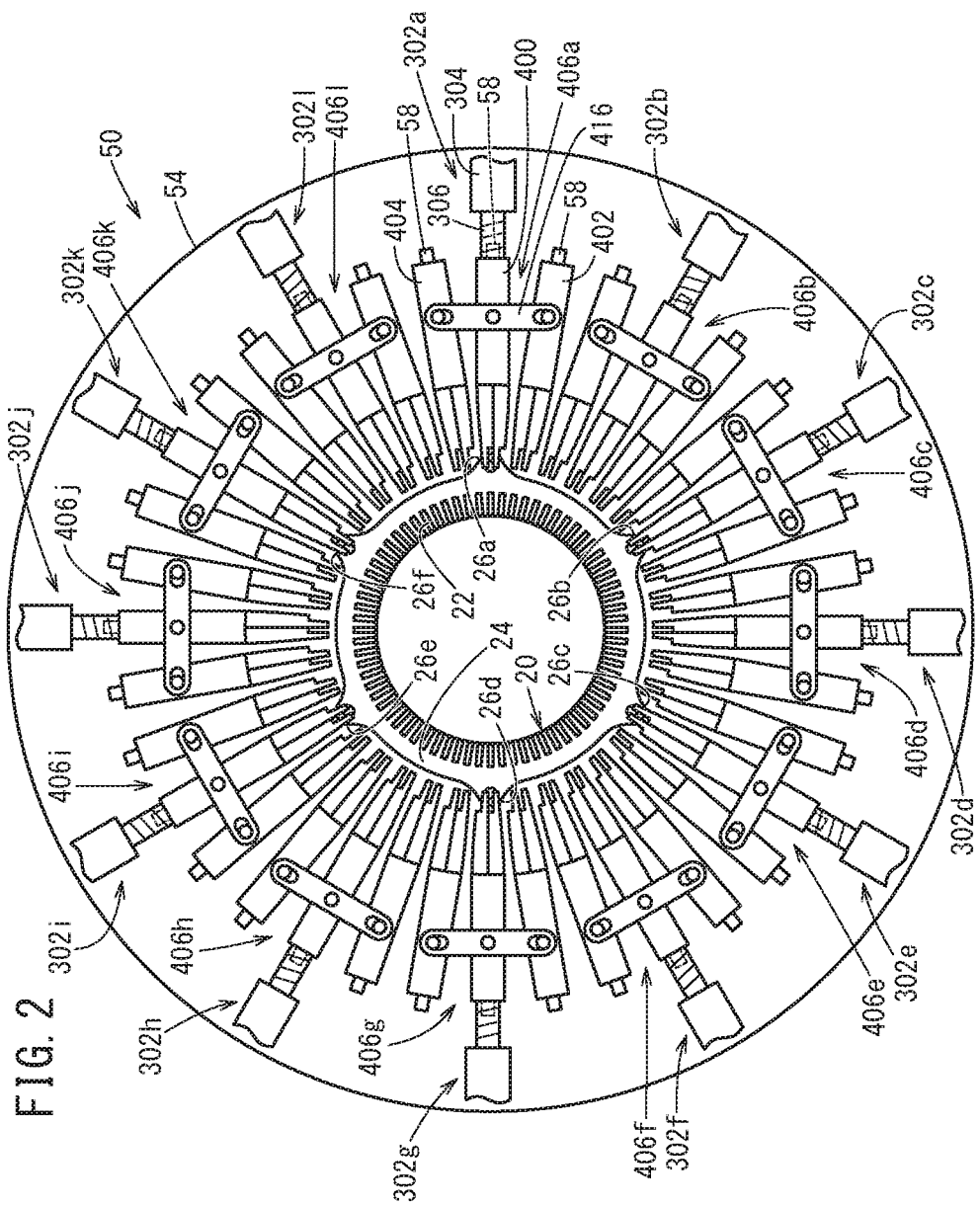
FIG. 2 is a schematic plan view showing a stator core into which segments are inserted, and an outer circumferential side guide member.
Figure 3:
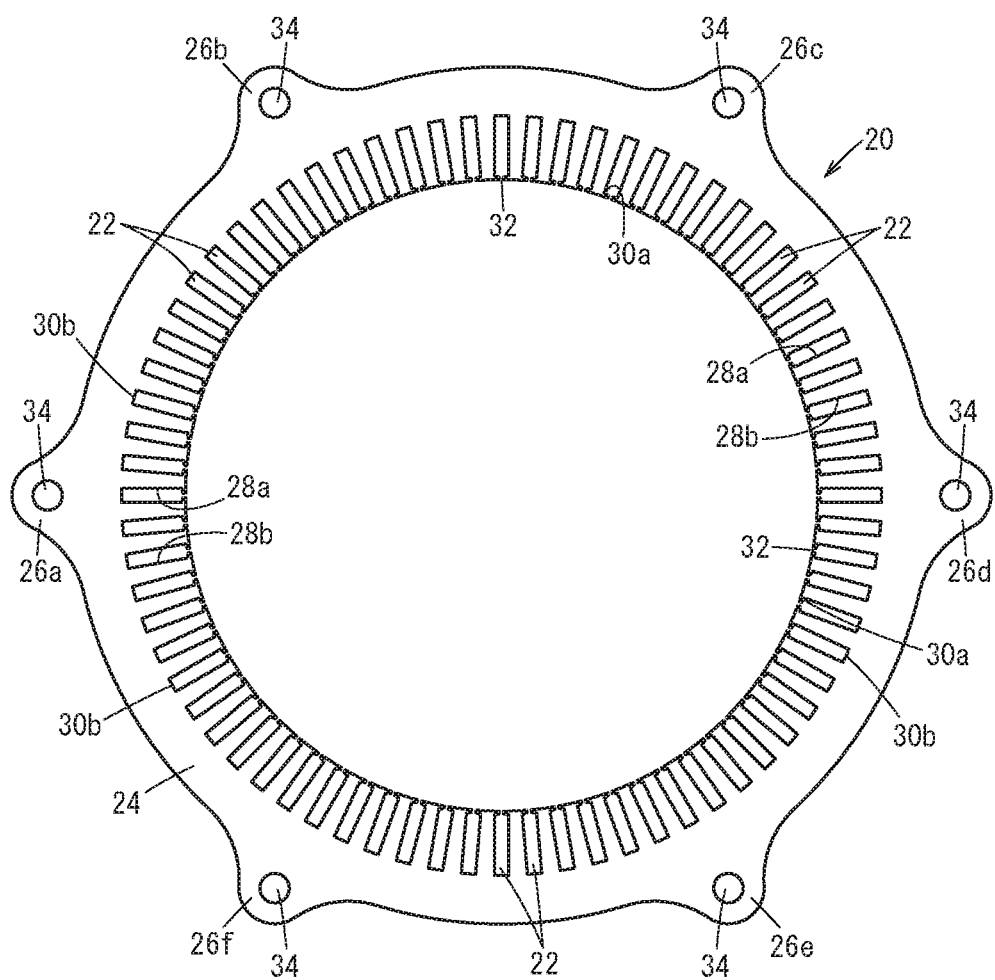
FIG. 3 is an enlarged plan view of the stator core shown in FIG. 2.

As shown in FIGS. 2 and 3, the legs 12 are inserted into a plurality of individual slots 22 formed in the stator core 20. The stator core 20 is formed, for example, as a laminated body in which thin-walled core plates are laminated in a direction perpendicular to the sheet surface of FIG. 2, and includes an annular portion 24, and a plurality of tab parts (in the present embodiment, six individual parts made up from first through sixth tab parts 26a to 26f) that protrude outwardly in diametrical directions from an outer circumferential part of the annular portion 24. The slots 22 are formed to extend radially on the inner circumferential side of the annular portion 24. In this case, the number of slots 22 is seventy-two.

In each of the slots 22, the direction along the diametrical direction of the annular portion 24 is a longitudinal direction. Ultimately, as shown in FIG. 3, each of the slots 22 has two long sides (diametrically directed sides) that extend along diametrical directions of the annular portion 24, and more specifically, a first long side 28a on a downstream side in the clockwise direction and a second long side 28b on an upstream side in the clockwise direction, and two short sides (circumferentially directed sides) that extend along a circumferential direction of the annular portion 24, and more specifically, a first short side 30a on the inner circumferential side and a second short side 30b on the outer circumferential side. Moreover, a portion of the first short side 30a is cut out. Due to such a cut out portion, an inner circumferential groove 32 is formed on the first short side 30a that opens in facing relation to the inner circumferential side of the annular portion 24.

The first through sixth tab parts 26a to 26f are disposed in a mutually spaced apart manner at equal intervals. The first through sixth tab parts 26a to 26f are formed with outer circumferential parts of the annular portion 24 serving as base sides thereof, and are shaped to resemble isosceles triangles with the base sides thereof being the longest end. However, the protruding distal ends thereof are curved and rounded. Fastening holes 34 are formed substantially in the centers of the first through sixth tab parts 26a to 26f. Bolts (not shown), which serve as fastening members for connecting the stator ST (see FIG. 17) to a casing together with tightening the plate cores that make up the stator ST to each other, are passed through the fastening holes 34.

Figure 4:
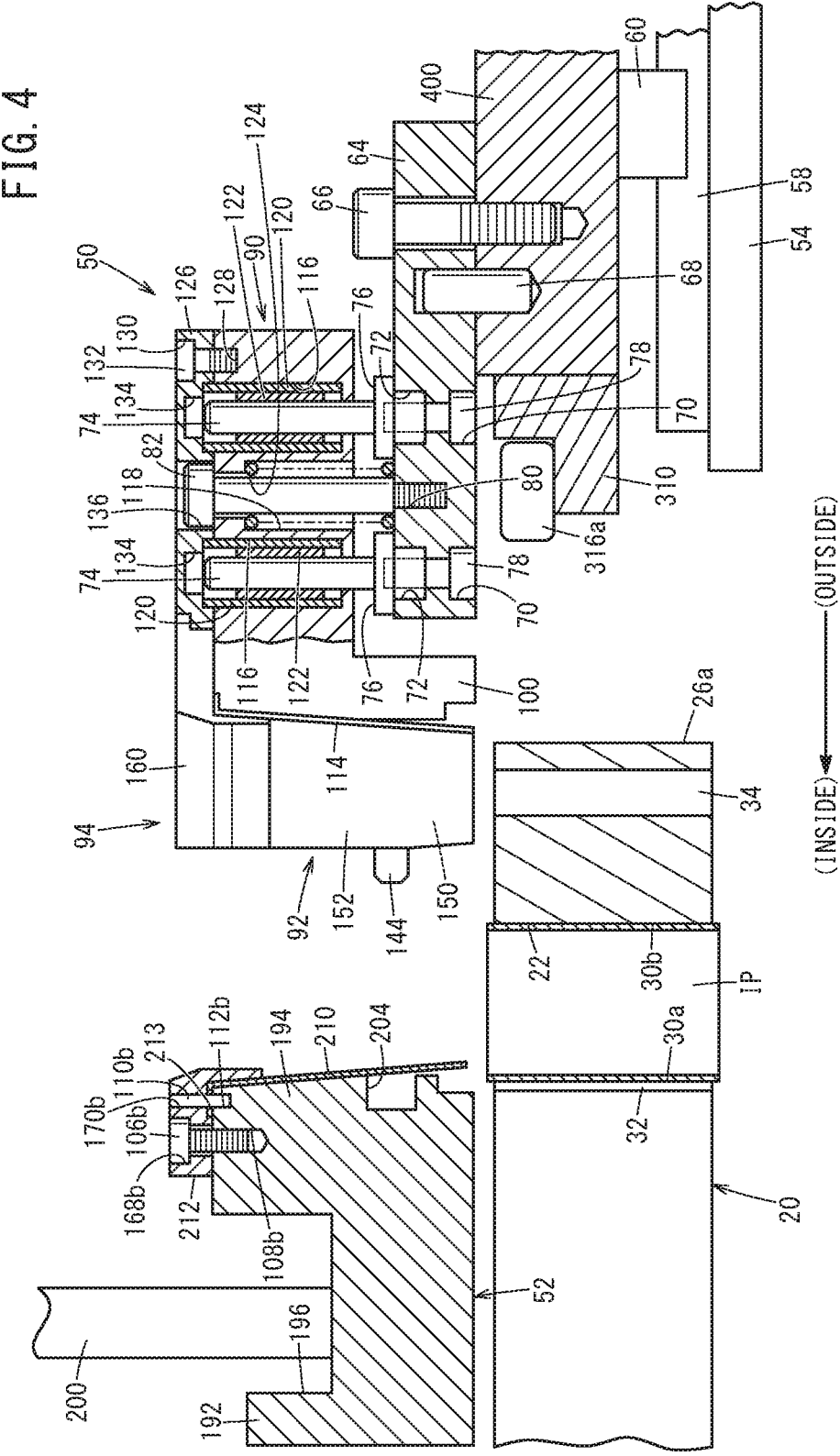
FIG. 4 is a partial cross-sectional side surface view of an inner circumferential side guide member, the stator core, and the outer circumferential side guide member.

Next, a leg insertion device (electric conductor insertion device) for inserting the legs 12 of the segments 10 into the slots 22 will be described. The leg insertion device is equipped with an outer circumferential side guide member 50 as shown in FIGS. 2 and 4, and an inner circumferential side guide member 52 (second supporting body) as shown in FIG. 4. The outer circumferential side guide member 50 surrounds the outer circumference of the stator core 20 which is positioned and fixed on a predetermined location of the leg insertion device, and one inner circumferential side guide member 52 is inserted while being capable of advancing and retracting on the inner circumferential side of the stator core 20.

The outer circumferential side guide member 50 includes the disk-shaped pedestal 54 as shown in FIG. 4. On the pedestal 54, guide rails 58 that extend along diametrical directions of the annular portion 24 are laid out thirty-six in number, and on each of the guide rails 58, any one of a driving slider 400, a first driven slider 402, and a second driven slider 404 is disposed displaceably via a sliding body 60. The driving slider 400 is disposed in a manner of being sandwiched between the first driven slider 402 and the second driven slider 404. The driving slider 400, the first driven slider 402, and the second driven slider 404 constitute one set of slider units by the three individual sliders 400, 402, and 404. According to the present embodiment, twelve sets of such slider units, i.e., first through twelfth slider units 406a to 406l, are provided.

Figure 5:
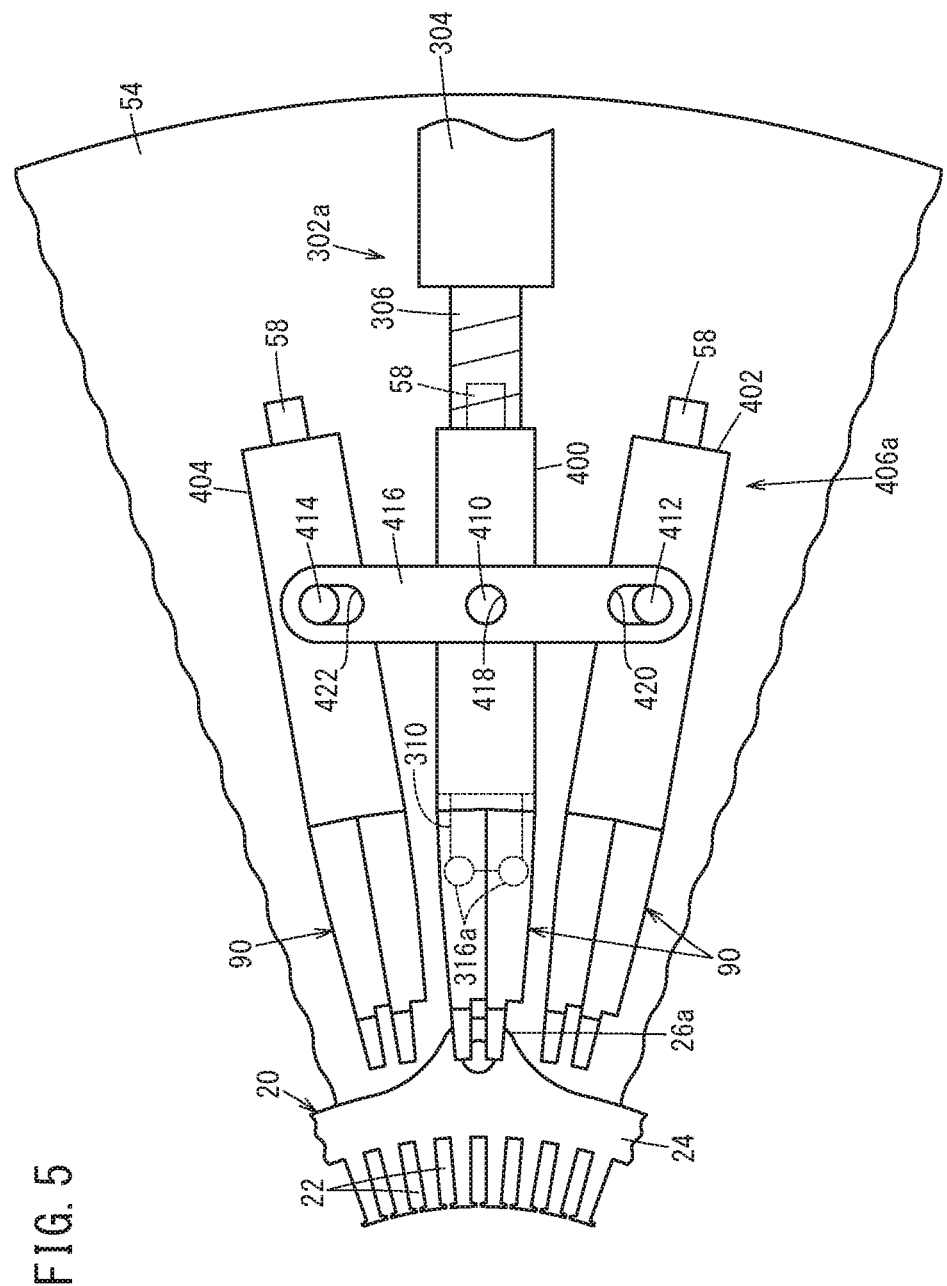
FIG. 5 is a schematic plan view of essential parts of a slider unit including a driving slider, a first driven slider, and a second driven slider.

As shown in detail in FIG. 5, a pin-shaped fitting 410 is formed to project from an upper surface of the driving slider 400, and together therewith, a first displacement assisting cam follower 412, and a second displacement assisting cam follower 414 are formed to project respectively on upper surfaces of the first driven slider 402 and the second driven slider 404. In addition, a long flat link member 416 is bridged across from the first driven slider 402, through the driving slider 400, and to the second driven slider 404. A connecting hole 418 is formed to penetrate through a substantially central portion in a longitudinal direction of the link member 416, and a first elongated hole 420 and a second elongated hole 422 are formed to penetrate through both ends of the link member 416. The pin-shaped fitting 410 is fitted into the connecting hole 418, and the first displacement assisting cam follower 412 and the second displacement assisting cam follower 414 are passed respectively through the first elongated hole 420 and the second elongated hole 422.

The first through twelfth slider units 406a to 406l are displaced respectively under the action of first through twelfth actuators 302a to 302l, so as to approach toward or separate away from each other along diametrical directions of the annular portion 24 of the stator core 20. In greater detail, each of the first through twelfth actuators 302a to 302l includes a servomotor 304 and a guide shaft 306, which is advanced or retracted under the action of the servomotor 304. As shown in FIG. 5 in which the first actuator 302a is exemplified, the driving slider 400 is connected to a distal end of the guide shaft 306 of the first actuator 302a.

More specifically, when the guide shaft 306 of the first actuator 302a is advanced or retracted, the driving slider 400 advances or retracts integrally with the guide shaft 306. Since the first driven slider 402 and the second driven slider 404 are connected to the driving slider 400 via the link member 416, the first driven slider 402 and the second driven slider 404 follow along with the driving slider 400 and are advanced or retracted together therewith.

Figure 12:
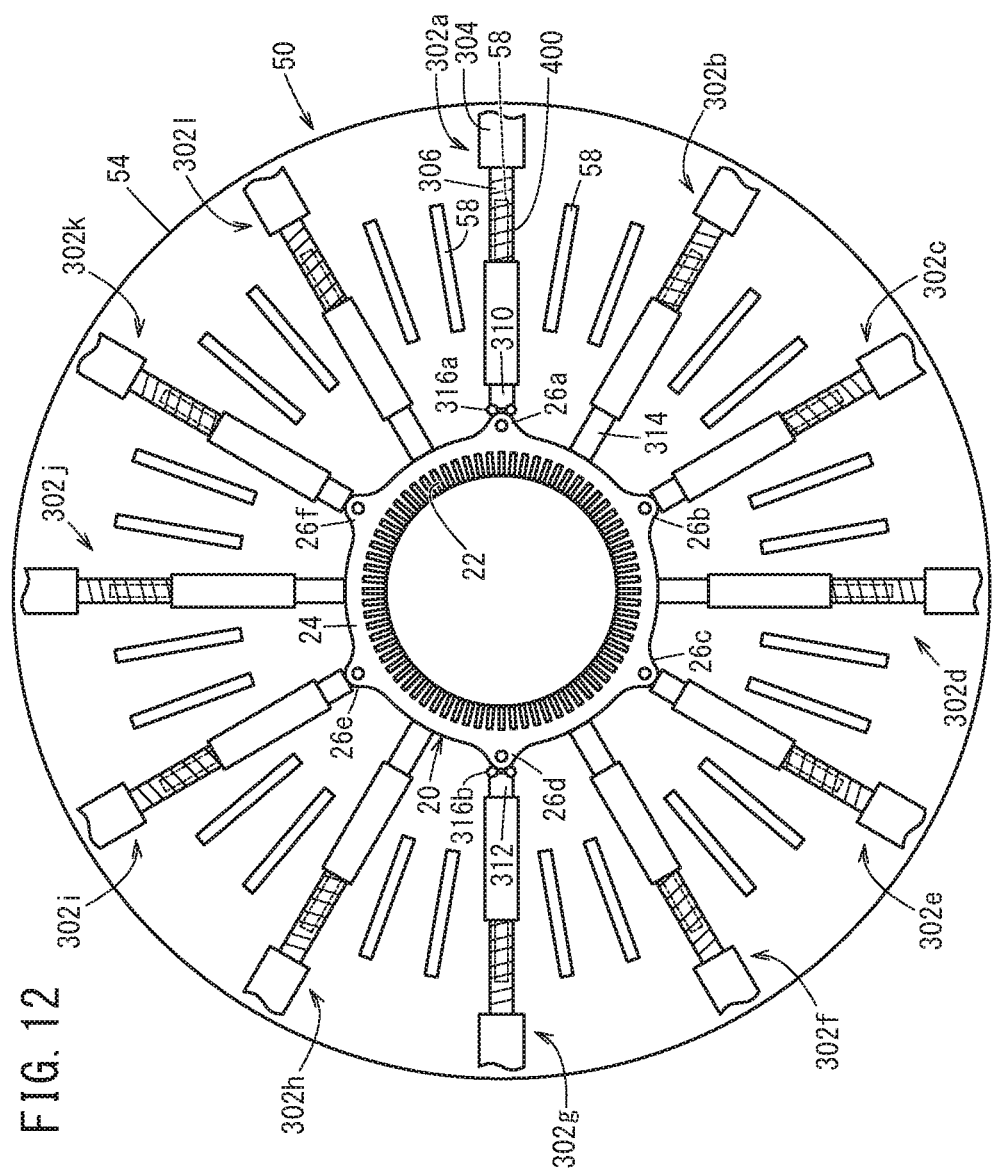
FIG. 12 is a schematic plan view schematically showing a state in which engagement elements, sub-engagement elements, and pressing elements provided on driving sliders press the stator core toward an inner circumferential side.

In this instance, at the distal ends of each of the driving sliders 400 of the first actuator 302a and the seventh actuator 302g facing toward the stator core 20, an engagement element 310 and a sub-engagement element 312, which are capable of engaging with the first tab part 26a and the fourth tab part 26d, are provided respectively (in particular, refer to FIG. 12). The engagement element 310 and the sub-engagement element 312 are in an opposing positional relationship, and the phase difference therebetween is roughly 180°.

Figure 6:
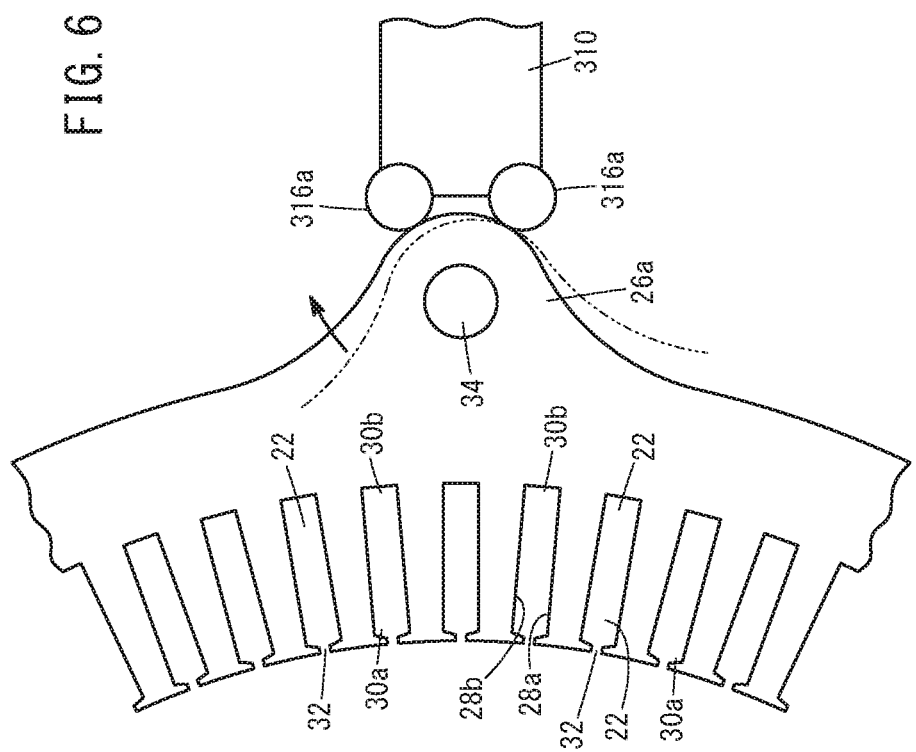
FIG. 6 is an enlarged plan view of a first tab part (engagement part) of the stator core, and a principal part of an engagement element provided on the driving slider.

FIG. 6 is an enlarged plan view of a principal part of the engagement element 310. It should be noted that illustration of a bracket 64 and a support block 90, which will be described later (refer to FIG. 4), is omitted. As shown in FIG. 6, a pair of alignment cam followers 316a are provided as rolling bodies on the distal end of the engagement element 310. The first tab part 26a enters into and engages between the alignment cam followers 316a. Similarly, a pair of alignment cam followers 316b are provided on the distal end of the sub-engagement element 312 (see FIG. 12). The fourth tab part 26d enters into and engages between the alignment cam followers 316b.

In contrast thereto, pressing elements 314 the distal ends of which are flat surfaces are formed to project on each of the driving sliders 400 of the remaining second through sixth actuators 302b to 302f and the eighth through twelfth actuators 302h to 302l. Among such elements, the pressing elements 314 of the third actuator 302c, the fifth actuator 302e, the ninth actuator 302i, and the eleventh actuator 302k abut respectively against the distal ends of the second tab part 26b, the third tab part 26c, the fifth tab part 26e, and the sixth tab part 26f. Furthermore, the pressing element 314 of the second actuator 302b abuts against an outer edge between the first tab part 26a and the second tab part 26b, and the pressing element 314 of the fourth actuator 302d abuts against an outer edge between the second tab part 26b and the third tab part 26c. Similarly, the pressing elements 314 of the sixth actuator 302f, the eighth actuator 302h, the tenth actuator 302j, and the twelfth actuator 302l each abut against respective outer edges between the third tab part 26c and the fourth tab part 26d, between the fourth tab part 26d and the fifth tab part 26e, the fifth tab part 26e and the sixth tab part 26f, and the sixth tab part 26f and the first tab part 26a.

Brackets 64 are disposed respectively on upper surfaces of each of the driving slider 400, the first driven slider 402, and the second driven slider 404. Each of the brackets 64 protrudes toward the outer circumference of the stator core 20 more so than the driving slider 400, the first driven slider 402, and the second driven slider 404, and is connected via a connecting bolt 66 and a connecting pin 68 to the driving slider 400, the first driven slider 402, or the second driven slider 404.

Two stepped holes 70 are formed on a lower surface side, and two mounting holes 72 are formed on an upper surface side, on a distal end of the bracket 64 that protrudes toward the side of the stator core 20. The two stepped holes 70 are located on the inner circumferential side and the outer side in the diametrical direction of the annular portion 24, and the two mounting holes 72 are connected to each of the stepped holes 70. Short head portions of guide rods 74 are inserted into the mounting holes 72. Flanges 76 which are larger in diameter than the head portions are formed on the guide rods 74, and the flanges 76 are blocked and held back near the openings of the mounting holes 72.

Further, female screw threads are formed on heads of the guide rods 74, and male screw threads of mounting bolts 78 that are passed through the stepped holes 70 are screwed-engaged with the female screw threads. Consequently, the guide rods 74 are positioned and fixed in the mounting holes 72. The stepped portions of the stepped holes 70 function as stoppers of the heads of the mounting bolts 78.

Furthermore, on the bracket 64, a screw hole 80 in which female screw threads are formed on an inner circumferential wall thereof is formed between the mounting holes 72. Male screw threads of a guide bolt 82 are screwed into the screw hole 80. A support block 90 (supporting body) is supported in a so-called floating manner on the bracket 64 through the guide bolt 82 and the guide rods 74.

Figure 7:
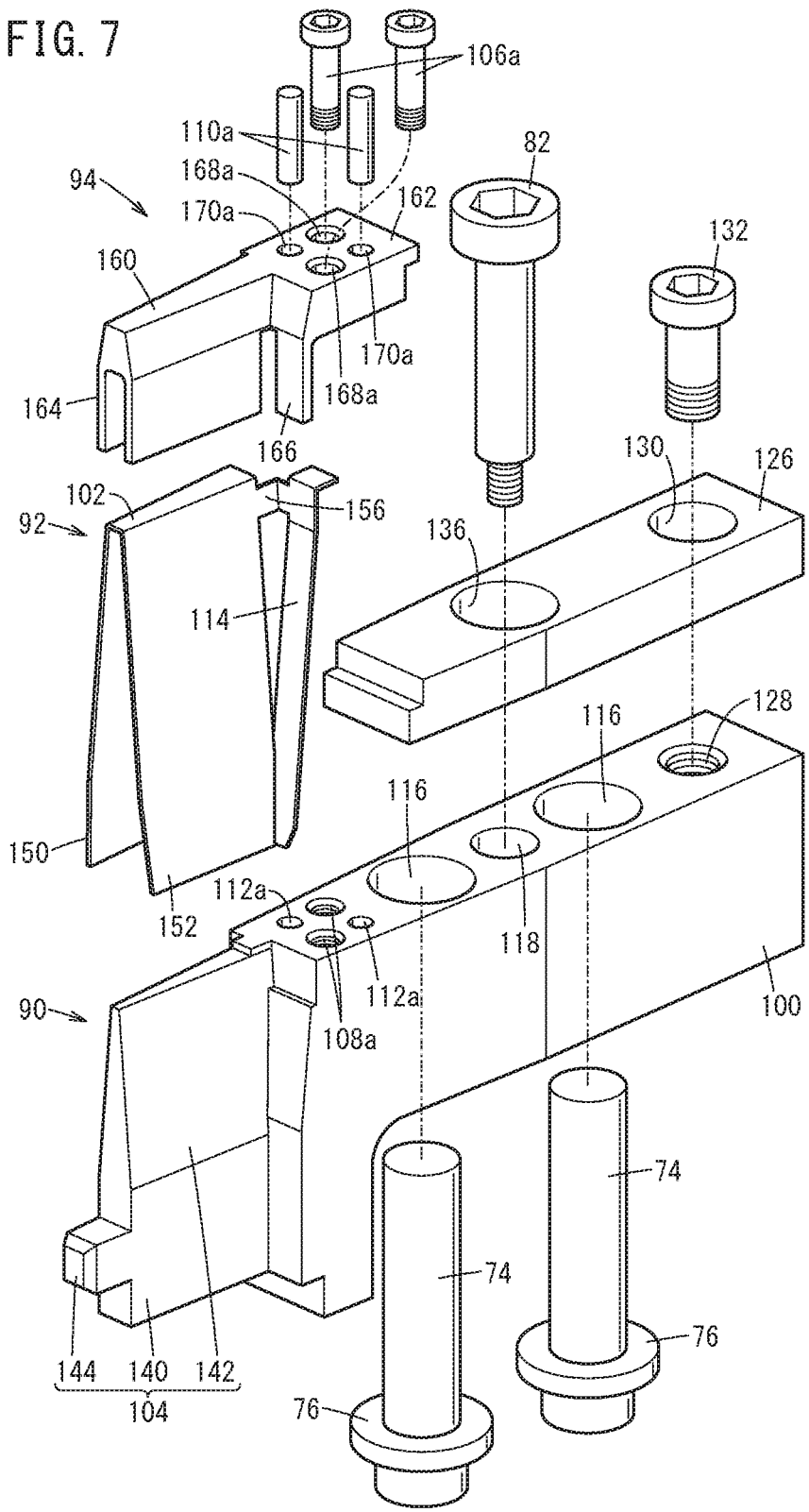
FIG. 7 is a schematic exploded perspective view showing a support block serving as a supporting body, a three-way guide member serving as a guide member, and an outer cap member for retaining the three-way guide member on the support block.

FIG. 7 is a schematic exploded perspective view showing the support block 90, a three-way guide member 92 (guide member), and an outer cap member 94. First, describing the support block 90, the support block 90 includes a block main body portion 100, and a bent portion mounting member 104 for mounting a bent portion 102 that constitutes part of the three-way guide member 92. Among such members, the block main body portion 100 extends along a diametrical direction of the annular portion 24. Further, as shown in FIG. 7, bolt fastening holes 108a in which fastening bolts 106a are screw-engaged, and pin fitting holes 112a in which positioning pins 110a are fitted are formed on an upper surface of one end on the inner circumferential side of the block main body portion 100 in proximity to the stator core 20. The bolt fastening holes 108a and the pin fitting holes 112a are positioned in a so-called staggered arrangement.

On the upper surface of the end of the block main body portion 100 on a side in proximity to the stator core 20, a later-described second short side guide section 114 (outer circumferentially directed side guide section) of the three-way guide member 92 is mounted. More specifically, the block main body portion 100 fulfills a role as an outer circumferentially directed side guide section mounting member. A slight clearance (relief space) is formed between the second short side guide section 114 and a lower end of the block main body portion 100.

On the block main body portion 100, two rod insertion holes 116 that extend along a height direction and into which the guide rods 74 are inserted, and a bolt insertion hole 118 through which the guide bolt 82 is passed are formed in parallel along a longitudinal direction (diametrical direction of the annular portion 24). Of course, the two rod insertion holes 116 are located at positions sandwiching the bolt insertion hole 118 therebetween. As can be understood from FIG. 4, the two rod insertion holes 116 are stepped through holes, the inner diameter at the lower end of which is small in diameter, and the inner diameter of the remaining majority thereof is large in diameter. In addition, the bolt insertion hole 118 is a stepped through hole, the inner diameter at the upper end of which is small in diameter, and the inner diameter of the remaining majority thereof is large in diameter.

Sleeves 120 are inserted into the rod insertion holes 116. The sleeves 120 are supported by stepped portions formed by the inner diametrical difference of the rod insertion holes 116. Additionally, slide guides 122 are sandwiched between the sleeves 120 and the guide rods 74. The slide guides 122 fulfill a role of smoothly promoting and facilitating the relative raising or lowering of the guide rods 74 relative to the slide guides 122.

On the other hand, a coil spring 124 serving as a resilient member is inserted into the bolt insertion hole 118. The guide bolt 82 is passed through the interior of the coil spring 124. Moreover, on the upper surface of the bracket 64, the lower end of the coil spring 124 is seated in the vicinity of the opening of the screw hole 80. Further, the upper end of the coil spring 124 abuts against a stepped portion formed by the inner diametrical difference of the bolt insertion hole 118.

Upper ends of the guide rods 74 protrude slightly from the rod insertion holes 116. Similarly, an upper end (head) of the guide bolt 82 protrudes slightly from the bolt insertion hole 118. A head cover 126, in which the upper ends that protrude in this manner are embedded, is connected to the block main body portion 100. More specifically, a support hole 128 and a support hole 130 are formed respectively in the vicinity of outer circumferential side end portions of the block main body portion 100 and the head cover 126. Male screw threads of a support bolt 132 that has passed through the support hole 128 are screw-engaged with female screw threads formed in the inner circumferential wall of the support hole 130, whereby the head cover 126 is positioned and fixed with respect to the block main body portion 100.

Two rod receiving holes 134 and a bolt insertion hole 136 are formed on the lower surface of the head cover 126. The rod receiving holes 134 cover the upper ends of the guide rods 74, together with the head of the guide bolt 82 being inserted into the bolt insertion hole 136. Moreover, when the support block 90 is elevated with respect to the driving slider 400, the first driven slider 402, or the second driven slider 404, the upper surfaces of the guide rods 74 are sufficiently separated from the ceiling surfaces of the rod receiving holes 134.

The bent portion mounting member 104 is formed in an outwardly projecting manner toward the annular portion 24 on an end surface on the inner circumferential side of the block main body portion 100 facing toward the annular portion 24. As shown in FIG. 7, the bent portion mounting member 104 includes a uniform width portion 140 of a substantially rectangular parallelepiped shape and having a substantially constant width along the circumferential direction of the annular portion 24, and an expanding portion 142 of a substantially triangular prism shape that widens from the top to the bottom. An engagement protrusion 144 (second engagement part) that is directed toward the annular portion 24 is formed to project on the uniform width portion 140.

Figure 8:
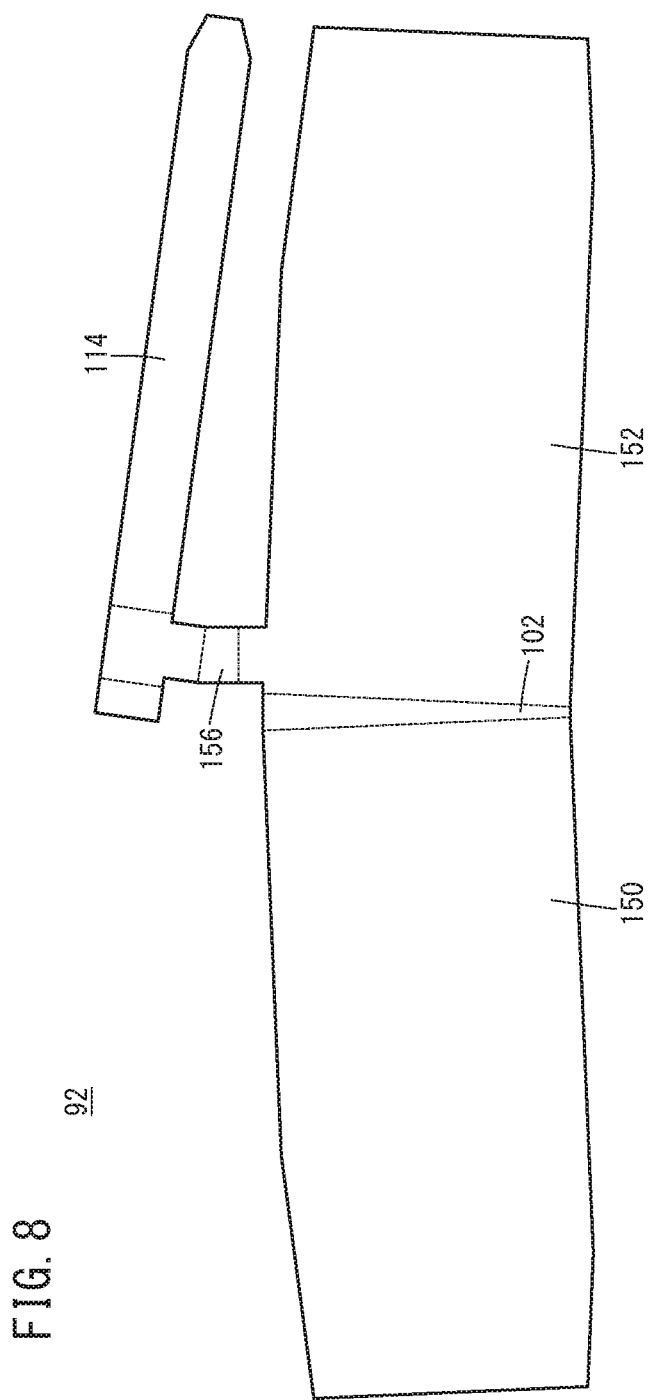
FIG. 8 is a developed view of the three-way guide member.

The three-way guide member 92 (guide member), a developed view of which is shown in FIG. 8, is supported on the bent portion mounting member 104. As can be understood from FIGS. 7 and 8, the three-way guide member 92 is made up from a single member on which there are integrally provided a first long side guide section 150 (first diametrically directed side guide section), a second long side guide section 152 (second diametrically directed side guide section), and a second short side guide section 114. The first long side guide section 150 and the second long side guide section 152 are disposed by being bent in a manner so that substantially rectangular large tongue pieces thereof form a fixed angle, and preferably, an angle that is slightly greater than an intersecting angle between the inclined surfaces of the expanding portion 142.

Figure 9:
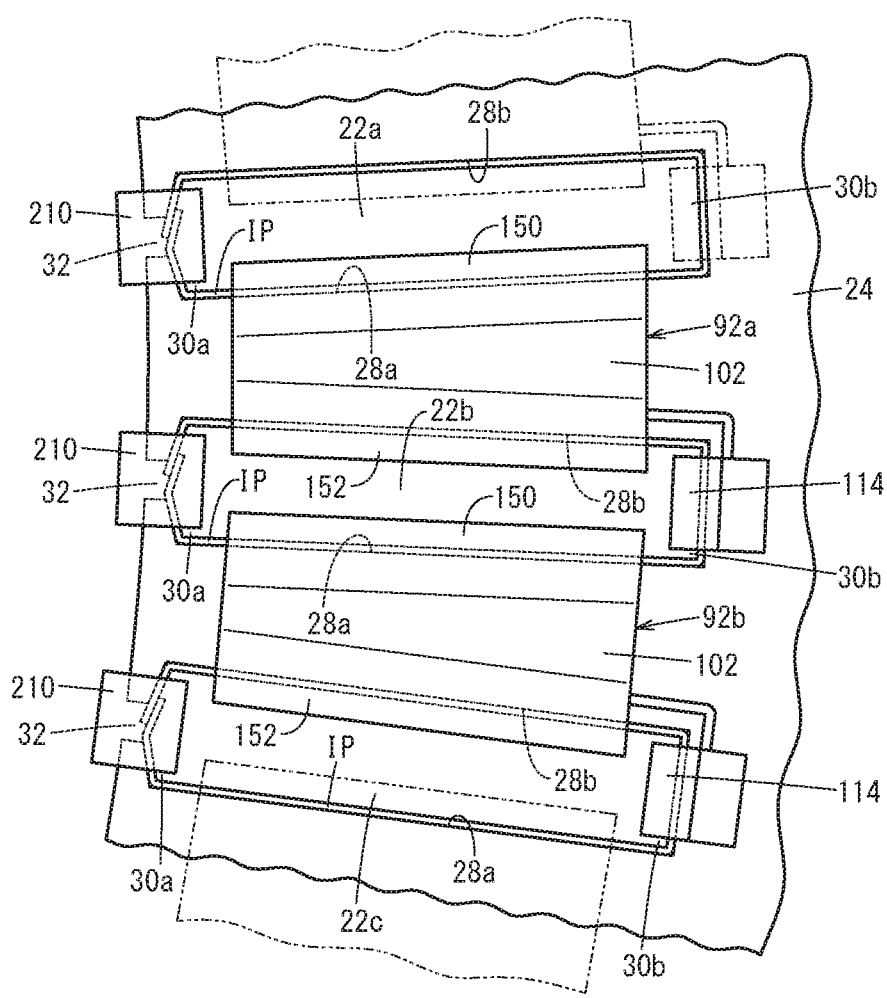
FIG. 9 is an enlarged plan view of essential parts schematically showing a state in which first long side guide sections, second long side guide sections, and second short side guide sections of three-way guide members are placed in proximity to the slots.

The first long side guide section 150 and the second long side guide section 152 of one of the three-way guide members 92 are placed in proximity to separate individual slots 22, as shown in FIG. 9. For the sake of convenience, among the plurality of individual slots 22, an arbitrary three individual slots 22 which are juxtaposed along the circumferential direction are defined as a first slot 22a, a second slot 22b, and a third slot 22c. In addition, an arbitrary two individual three-way guide members 92 which are adjacent to each other along the circumferential direction, are defined as a first three-way guide member 92a and a second three-way guide member 92b. The first long side guide section 150 of the first three-way guide member 92a is placed in proximity to the first slot 22a from a side of the first long side 28a of the first slot 22a, and the second long side guide section 152 thereof is placed in proximity to the second slot 22b from a side of the second long side 28b of the second slot 22b. Furthermore, the first long side guide section 150 of the second three-way guide member 92b is placed in proximity to the second slot 22b from a side of the first long side 28a of the second slot 22b. The second long side guide section 152 of the second three-way guide member 92b is placed in proximity to the third slot 22c from a side of the second long side 28b of the third slot 22c.

In the manner described above, on the first long side 28a and the second long side 28b of the same slot 22, the first long side guide section 150 and the second long side guide section 152 of mutually adjacent and separate three-way guide members 92 face toward one another, respectively. Stated otherwise, the first long side guide section 150 and the second long side guide section 152 of one of the three-way guide members 92 are placed respectively in proximity to mutually adjacent ones of the slots 22.

The second short side guide section 114 is connected to the second long side guide section 152 via a slightly inclined bridge section 156. The second short side guide section 114 extends in both directions in a substantially perpendicular manner from a location where it connects with the bridge section 156. The short extended portion thereof is bent along an upper surface from an inner circumferentially directed distal end surface of the block main body portion 100, and is placed on the upper surface together with being sandwiched between the upper surface and the outer cap member 94. On the other hand, the elongated extended portion thereof approaches toward the same slot 22 as the second long side guide section 152. In the example described above, the second short side guide section 114 of the second three-way guide member 92b approaches together with the second long side guide section 152 toward the second slot 22b.

The first long side guide section 150 is inclined in a direction to separate away from the second slot 22b as it proceeds downwardly toward the first slot 22a. Further, the second long side guide section 152 is inclined in a direction to approach the third slot 22c as it proceeds downwardly toward the second slot 22b. Furthermore, the second short side guide section 114 is inclined to approach the side of the first short side 30a as it proceeds downwardly.

In the three-way guide member 92 which is configured in the foregoing manner, the first long side guide section 150 and the second long side guide section 152 are disposed along the inclined surfaces of the expanding portion 142, which is a part of the support block 90, and the bent portion 102 is placed on the apex (the intersection of the inclined surfaces) of the expanding portion 142.

The outer cap member 94 covers the three-way guide member 92 that is supported on the support block 90 as described above. The outer cap member 94 is a single member in which there are integrally included a bent portion sandwiching part 160 and a second short side guide section sandwiching part 162 (outer circumferentially directed side guide section sandwiching part).

The bent portion sandwiching part 160 projects while pointing in an inner circumferential direction from the inner circumferential side distal end of the second short side guide section sandwiching part 162, together with a downwardly opening substantially inverted U-shaped insertion groove 164 being provided thereon. Two side walls defining the insertion groove 164 sandwich the first long side guide section 150 and the second long side guide section 152. In the case that the intersecting angle (bending angle of the bent portion 102) between the first long side guide section 150 and the second long side guide section 152 is greater than the intersecting angle of the inclined surfaces of the expanding portion 142, when the first long side guide section 150 and the second long side guide section 152 are inserted into the insertion groove 164, the first long side guide section 150 and the second long side guide section 152 are pressed by the two side walls inside the insertion groove 164, and are corrected so as to conform to the expanding portion 142.

At a distal end on the inner circumferential side of the second short side guide section sandwiching part 162, a pressing plate 166 is provided, which is adjacent to the bent portion sandwiching part 160 and extends downwardly. The pressing plate 166 holds down an upper part of the second short side guide section 114 against a side of the inner circumferential side distal end surface of the block main body portion 100 that constitutes the support block 90.

In addition, the second short side guide section sandwiching part 162 sandwiches together with the upper surface the short extended portion of the second short side guide section 114, which is bent along the upper surface from the inner circumferentially directed distal end surface of the block main body portion 100. As a result, the three-way guide member 92 is stably supported by the support block 90 on any of the first long side 28a, the second long side 28b, and the second short side 30b of the slots 22.

Bolt stopping holes 168a and pin insertion holes 170a pass through the second short side guide section sandwiching part 162 along the vertical direction which is a thickness direction. The bolt stopping holes 168a are stepped through holes, the lower inner diameters of which are small in diameter and the upper inner diameters of which are large in diameter, and include stepped portions that are formed by an inner diametrical difference, together with being contiguous in an overlapping manner with the bolt fastening holes 108a. On the other hand, the inner diameters of the pin insertion holes 170a, which are contiguous in an overlapping manner with the pin fitting holes 112a, are substantially constant.

The positioning pins 110a are passed through the pin insertion holes 170a and are fitted into the pin fitting holes 112a so as to prevent the outer cap member 94 from rotating. Further, the fastening bolts 106a are passed through the bolt stopping holes 168a and are screwed into the bolt fastening holes 108a to thereby fasten the outer cap member 94 to the block main body portion 100. The heads of the fastening bolts 106a are blocked by the stepped portions inside the bolt stopping holes 168a.

The driving slider 400, the first driven slider 402, and the second driven slider 404 respectively support two assemblies, each of which includes a support block 90, a three-way guide member 92, and an outer cap member 94. Stated otherwise, six individual assemblies are retained on the first slider unit 406a. The same applies to the remaining second through twelfth slider units 406b to 406l.

In the manner described above, each of the assemblies (the support block 90, the three-way guide member 92, and the outer cap member 94) is supported by a driving slider 400, a first driven slider 402, or a second driven slider 404 via the bracket 64. Accordingly, the assemblies are advanced integrally together with the driving sliders 400, the first driven sliders 402, or the second driven sliders 404, accompanying the advancement of all of the guide shafts 306 synchronously toward the inner circumferential side of the stator core 20. Stated otherwise, the three-way guide members 92 are gathered together as a set. Conversely thereto, the three-way guide members 92 are separated radially together with being retracted integrally toward the outer circumferential side, accompanying the retraction of all of the guide shafts 306 synchronously toward the outer circumferential side.

Figure 10:
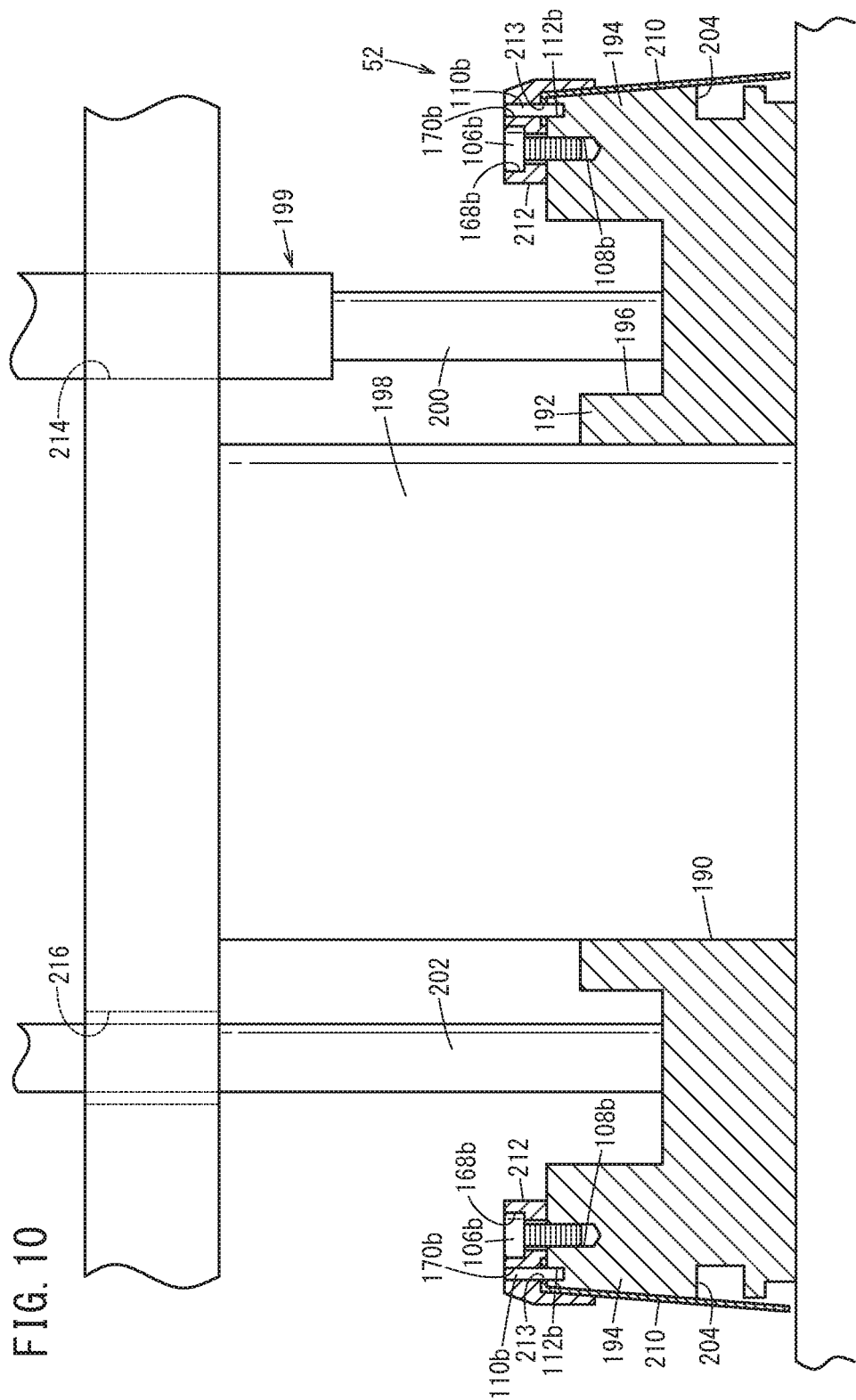
FIG. 10 is a side cross-sectional view of essential parts of the inner circumferential side guide member.

As shown in FIG. 10, the inner circumferential side guide member 52 is formed in an annular shape by a receiving hole 190 being formed in the center thereof, and includes an inner side circumferential wall portion 192 which is erected in a circling manner at an inner circumferential edge portion, and an outer side circumferential wall portion 194 which is erected in a circling manner at an outer circumferential edge portion. A relatively recessed or sunken annular recess 196 is formed between the inner side circumferential wall portion 192 and the outer side circumferential wall portion 194.

A gripping mechanism that grips the segments 10 is constructed in the receiving hole 190, and an entering shaft member 198 which is capable of being raised and lowered enters into the receiving hole 190. More specifically, the entering shaft member 198 enters into the receiving hole 190 as the gripping mechanism descends, and is retracted from the receiving hole 190 as the gripping mechanism ascends.

A lower end of a raising and lowering rod 200 which constitutes part of a raising and lowering cylinder 199 (supporting body displacement mechanism) is connected to the annular recess 196 (see FIG. 4). The inner circumferential side guide member 52 is raised in following relation with the raising (retraction) of the raising and lowering rod 200, and is lowered in following relation with the lowering (advancement) of the raising and lowering rod 200. Further, a guiding bar 202 is inserted at a position where the phase difference of the annular recess 196 from the raising and lowering rod 200 is roughly 180°. In the leg insertion device, a lower end of the guiding bar 202 is connected to a non-illustrated support base provided below the inner circumferential side guide member 52.

Engagement recesses 204 (first engagement parts) are formed on the side circumferential wall of the outer side circumferential wall portion 194, and more specifically, on the outer circumferential wall of the inner circumferential side guide member 52. As will be discussed later, the engagement protrusions 144 provided on the support blocks 90 engage with the engagement recesses 204.

The outer side circumferential wall portion 194 functions as a first short side guide member, whereas one-way guide members 210 (inner circumferentially directed side guide sections) are positioned and fixed via inner cap members 212 (inner circumferentially directed side guide section sandwiching parts). More specifically, two bolt fastening holes 108b and two pin fitting holes 112b are formed in a staggered arrangement on an upper surface of the outer side circumferential wall portion 194. In addition, the pin passage holes 213 penetrate through the one-way guide members 210. Furthermore, in the inner cap members 212, in the same manner as the bolt stopping holes 168a and the pin insertion holes 170a, bolt stopping holes 168b which are stepped through holes, and pin insertion holes 170b the inner diameters of which are substantially constant penetrate therethrough. The inner cap members 212 and the one-way guide members 210 are prevented from rotating by the positioning pins 110b that are passed through the pin insertion holes 170b and the pin passage holes 213, and are fitted into the pin fitting holes 112b.

Further, the inner cap members 212 are connected to the outer side circumferential wall portion 194 by the fastening bolts 106b that are passed through the bolt stopping holes 168b and are screw-engaged in the bolt fastening holes 108b. The heads of the fastening bolts 106b are blocked by the stepped portions inside the bolt stopping holes 168b.

Each of the one-way guide members 210 is inclined so as to approach toward the inner circumferential side of the stator core 20 as it proceeds upwardly from below. The one-way guide member 210 faces toward the second short side guide section 114 of the three-way guide member 92, in a manner so that a slight clearance (relief space) is formed between the lower end of the outer side circumferential wall portion 194.

The gripping mechanism includes a disk-shaped clamp member (not shown), and the entering shaft member 198 that projects and extends downwardly from the center of a clamp member. The clamp member retains the segments 10 in a posture with the legs 12 thereof facing downwardly and the turn portions 14 thereof facing upwardly. Moreover, a rod insertion hole 214 and a bar insertion hole 216 through which the raising and lowering rod 200 and the guiding bar 202 individually pass penetrate through the entering shaft member 198. The phase difference between the rod insertion hole 214 and the bar insertion hole 216 is roughly 180°.

The leg insertion device according to the present embodiment is basically constructed in the manner described above. Next, operations and effects of the leg insertion device will be described. The following actions or operations, unless otherwise specified, are performed under the control of a non-illustrated control circuit.

The leg insertion device operates in the following manner in order to insert the legs 12 of the segments 10 into the slots 22. More specifically, at first, the operator retains the stator core 20, in which the insulating paper IP (see FIG. 4) has been previously inserted into the slots 22, at a predetermined position of the leg insertion device. Thereafter, the stator core 20 is raised and transported to a position where the inner circumferential side guide member 52 is disposed. At this point in time, as shown in FIG. 4, the stator core 20 is positioned relatively lower than the inner circumferential side guide member 52 is. Accordingly, the one-way guide members 210 are positioned upwardly of the slots 22.

On the other hand, the clamp member that constitutes the gripping mechanism grips the segments 10 with the legs 12 thereof facing downwardly and the turn portions 14 thereof facing upwardly, and moves the stator core 20 in an upward direction. At this time, the legs 12 are positioned above the slots 22. Further, the first through twelfth slider units 406a to 406l are kept in a waiting state on the outer circumferential side of the stator core 20.

Next, the servomotors 304 that constitute the first through twelfth actuators 302a to 302l are energized. Consequently, the first through twelfth slider units 406a to 406l approach (advance) toward the stator core 20 integrally with the guide shafts 306. Although the first through twelfth slider units 406a to 406l may be made to undergo advancing movement simultaneously, preferably, after the advancing movement of the first slider unit 406a has ended first, and then the advancing movement of the seventh slider unit 406g is ended next, the remaining second through sixth slider units 406b to 406f and the eighth through twelfth slider units 406h to 406l are made to undergo advancing movement.

Figure 11:
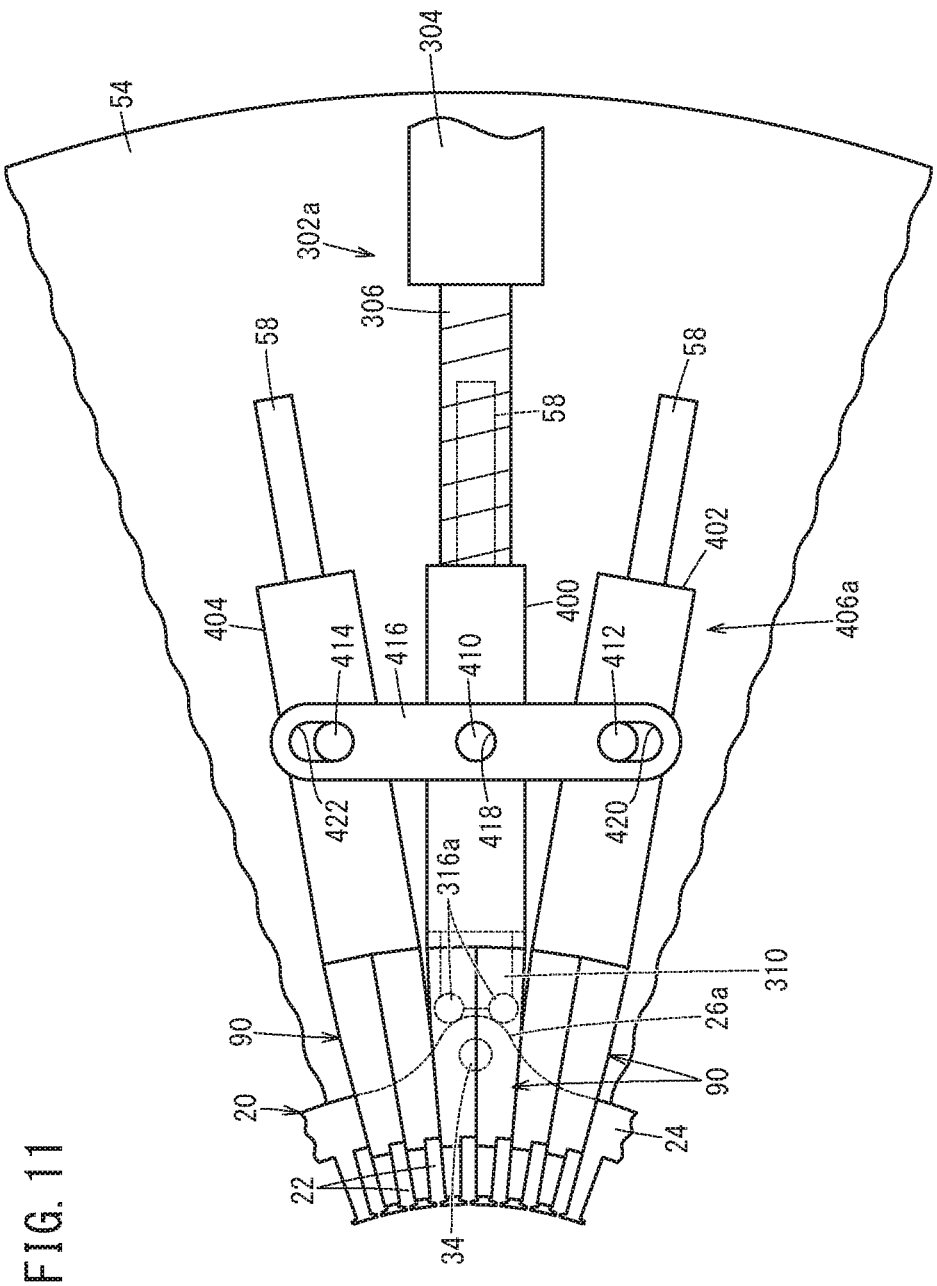
FIG. 11 is a schematic plan view of essential parts showing a state in which the driving slider, the first driven slider, and the second driven slider are displaced from the state shown in FIG. 5 toward the inner circumferential side of the stator core.

More specifically, the first driven slider 402 and the second driven slider 404 are connected via the link member 416 to the driving slider 400 that makes up each of the slider units. Therefore, accompanying the advancing movement of the driving slider 400, the first driven slider 402 and the second driven slider 404 also advance toward the stator core 20. At this time, as shown in FIG. 11, the first displacement assisting cam follower 412 and the second displacement assisting cam follower 414 move within the first elongated hole 420 and the second elongated hole 422 toward the sides of the driving slider 400. Therefore, it is possible for the first driven slider 402 and the second driven slider 404 to undergo advancing movement together with the driving slider 400. When the driving slider 400, the first driven slider 402, and the second driven slider 404 are moved forward, the sliding bodies 60 thereof slide on the guide rails 58.

On each of the driving sliders 400 of the first actuator 302a and the seventh actuator 302g, there are respectively provided the engagement element 310 and the sub-engagement element 312, together with the alignment cam followers 316a and 316b being provided at the respective distal ends thereof (refer to FIG. 4). Therefore, even if the first tab part 26a is slightly displaced with respect to the engagement element 310 as shown by the imaginary line in FIG. 6, after the alignment cam followers 316a have come into abutment against an outer wall of the first tab part 26a, the first tab part 26a is pressed by further advancement thereof. Due to being pressed in this manner, the posture of the stator core 20 is corrected via the first tab part 26a. As a result, the first tab part 26a enters into (engages) between the alignment cam followers 316a, and consequently, alignment and positioning of the first tab part 26a is achieved by the alignment cam followers 316a.

Next, the sub-engagement element 312 comes into abutment against the outer wall of the fourth tab part 26d. For the same reasons as discussed above, even if the fourth tab part 26d is slightly displaced with respect to the sub-engagement element 312, since the alignment cam followers 316b correct the posture of the stator core 20 via the fourth tab part 26d, the fourth tab part 26d enters into and engages between the alignment cam followers 316b. In this state, the first actuator 302a and the seventh actuator 302g press on the first tab part 26a and the fourth tab part 26d via the engagement element 310 and the sub-engagement element 312. More specifically, the stator core 20 is gripped by the two individual engagement elements described above, and the stator core 20 is positioned and fixed in place.

Next, the pressing elements 314 of the third actuator 302c, the fifth actuator 302e, the ninth actuator 302i, and the eleventh actuator 302k abut respectively against the distal ends of the second tab part 26b, the third tab part 26c, the fifth tab part 26e, and the sixth tab part 26f. Furthermore, the pressing element 314 of the second actuator 302b abuts against an outer edge between the first tab part 26a and the second tab part 26b, and the pressing element 314 of the fourth actuator 302d abuts against an outer edge between the second tab part 26b and the third tab part 26c. Similarly, the pressing elements 314 of the sixth actuator 302f, the eighth actuator 302h, the tenth actuator 302j, and the twelfth actuator 302l each abut against respective outer edges between the third tab part 26c and the fourth tab part 26d, between the fourth tab part 26d and the fifth tab part 26e, the fifth tab part 26e and the sixth tab part 26f, and the sixth tab part 26f and the first tab part 26a. As a result, the state shown in FIG. 12 is brought about. In this state, the second through sixth actuators 302b to 302f and the eighth through twelfth actuators 302h to 302l press the stator core 20 toward the inner circumferential side via the pressing elements 314.

By the first through twelfth actuators 302a to 302l pressing on the stator core 20 toward the inner circumferential side in the manner described above, the stator core 20 is firmly positioned and fixed in place.

Further, accompanying the first through twelfth slider units 406a to 406l being displaced (advanced) toward the stator core 20 in the manner described above, as shown in FIG. 13, the support blocks 90, the three-way guide members 92, and the outer cap members 94 are displaced in close proximity to the stator core 20, or stated otherwise, are gathered together on the inner circumferential side of the stator core 20. As a result, the engagement protrusions 144 engage with the engagement recesses 204, and together therewith, the three-way guide members 92 are positioned above the slots 22 in a state of being in close proximity to the one-way guide members 210.

Figure 14:
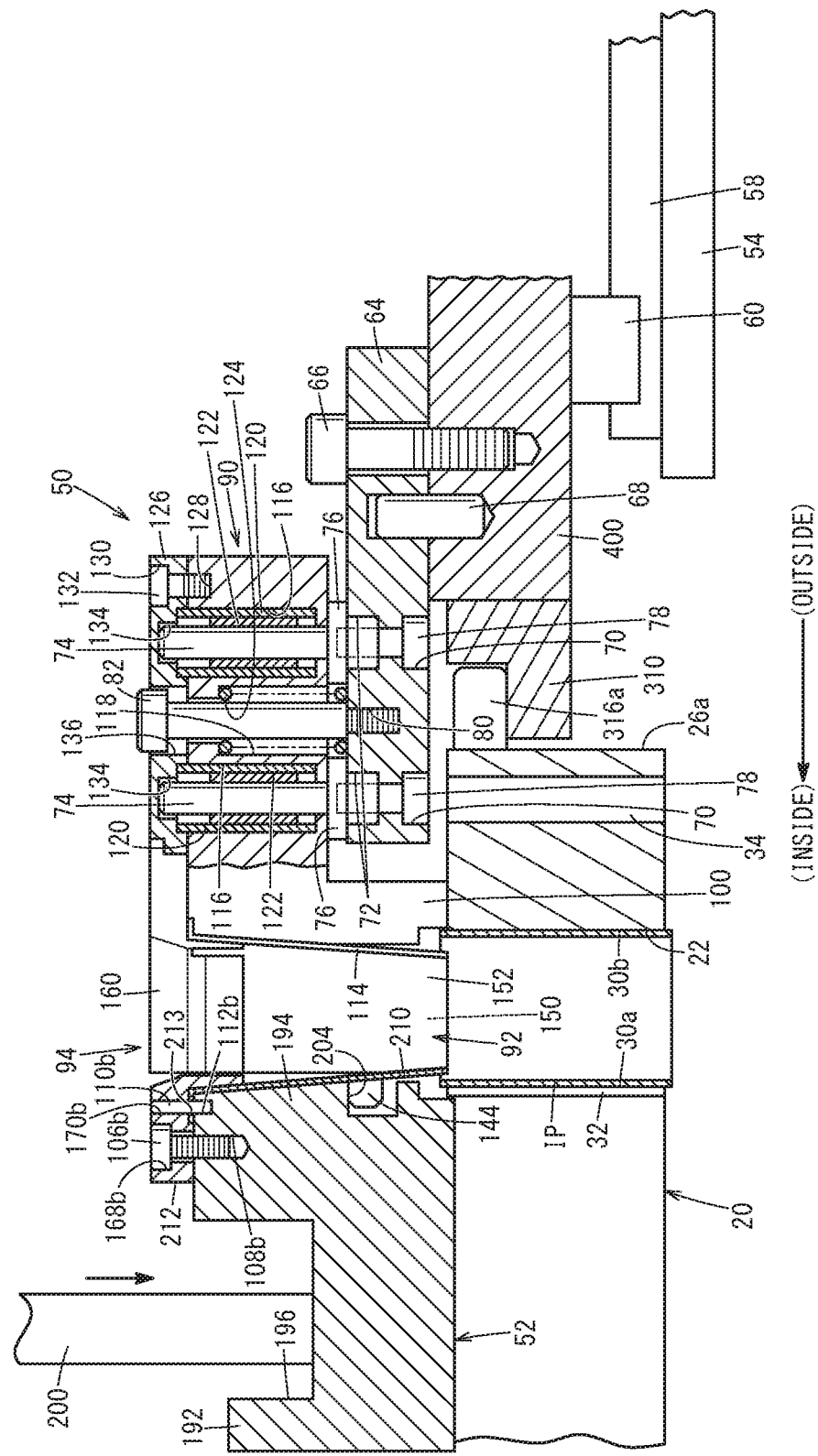
FIG. 14 is a side view of essential parts showing a state in which the slider unit and the inner circumferential side guide member are lowered from the state shown in FIG. 13, and a lower end of the three-way guide member approaches toward a slot.

Next, as shown in FIG. 14, the raising and lowering cylinder 199 is energized to move the raising and lowering rod 200 in an advancing (descending) direction. Along therewith, the inner circumferential side guide member 52 descends in a direction toward the stator core 20 while being guided by the guiding bar 202. Since the engagement protrusion 144 provided on the support block 90 engages with the engagement recess 204 formed on the outer side circumferential wall portion 194, the support block 90 follows the inner circumferential side guide member 52 in a descending manner.

When the support blocks 90 descend, the coil springs 124 contract along the guide bolts 82. Further, the slide guides 122 slide relatively with respect to the guide rods 74. Therefore, the first through twelfth slider units 406a to 406l and the pedestal 54, etc., do not descend, but the positions thereof are maintained.

By the support blocks 90 descending, as shown in FIG. 9, the lower ends of the one-way guide members 210 approach toward the first short sides 30a on the inner circumferential sides of the slots 22. The second long side guide section 152 and the second short side guide section 114 of one of the three-way guide members 92 (the first three-way guide member 92a) approach respectively toward the second long side 28b and the second short side 30b in the same slot 22. The first long side guide section 150 of another one of the three-way guide members 92 (the second three-way guide member 92b) approaches toward the first long side 28a of this slot 22. Moreover, the first long side guide section 150 of the three-way guide member 92 approaches toward the first long side 28a of the slot 22 that lies adjacent thereto on the upstream side in a clockwise direction with respect to the slot 22.

The upper ends of the insulating papers IP, which have been inserted beforehand into the slots 22, are pressed outwardly toward the respective inner wall sides of the slots 22 by the one-way guide members 210, the second long side guide sections 152, the second short side guide sections 114, and the first long side guide sections 150 which are disposed in proximity to the slots 22. Stated otherwise, the upper ends of the insulating papers IP are covered by the back surfaces of the respective lower ends of the one-way guide members 210, the second long side guide sections 152, the second short side guide sections 114, and the first long side guide sections 150. In accordance with this feature, the insulating papers IP are positioned and fixed in place.

The one-way guide members 210, the second long side guide sections 152, the second short side guide sections 114, and the first long side guide sections 150 approach toward one other as they proceed downwardly within the same slots 22. Stated otherwise, the internal spaces formed by the one-way guide members 210, the second long side guide sections 152, the second short side guide sections 114, and the first long side guide sections 150 are contracted in a downward direction.

Figure 15:
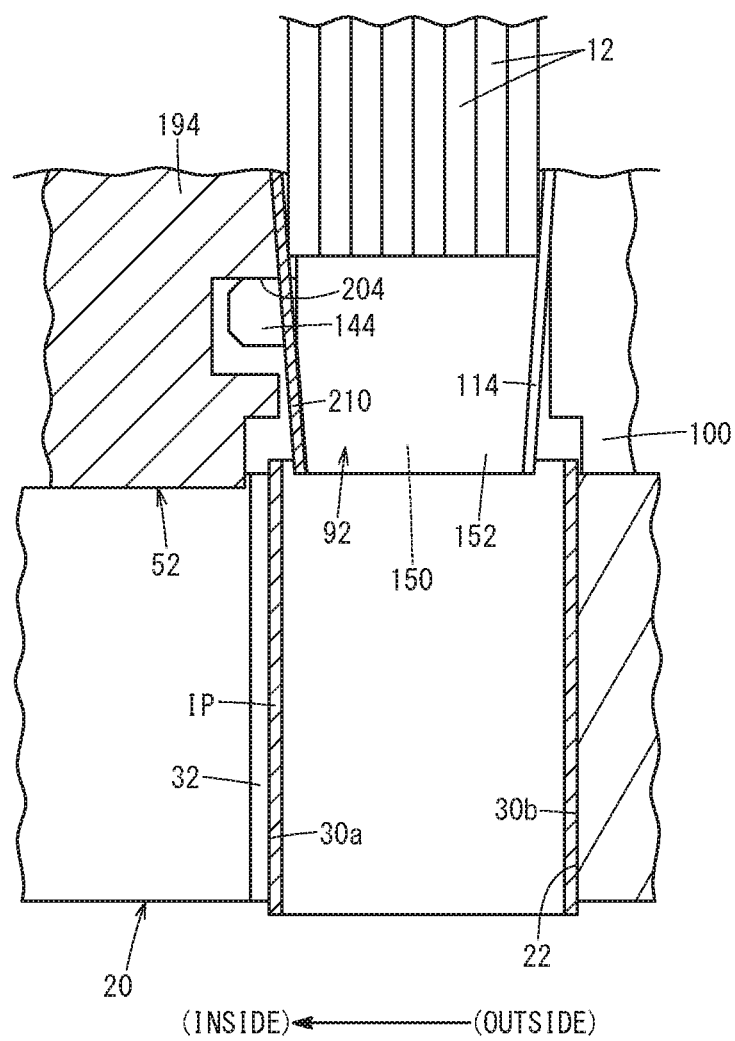
FIG. 15 is an enlarged cross-sectional view of essential parts showing a state in which legs of the segments are advanced toward the interior of a slot.
Figure 16:
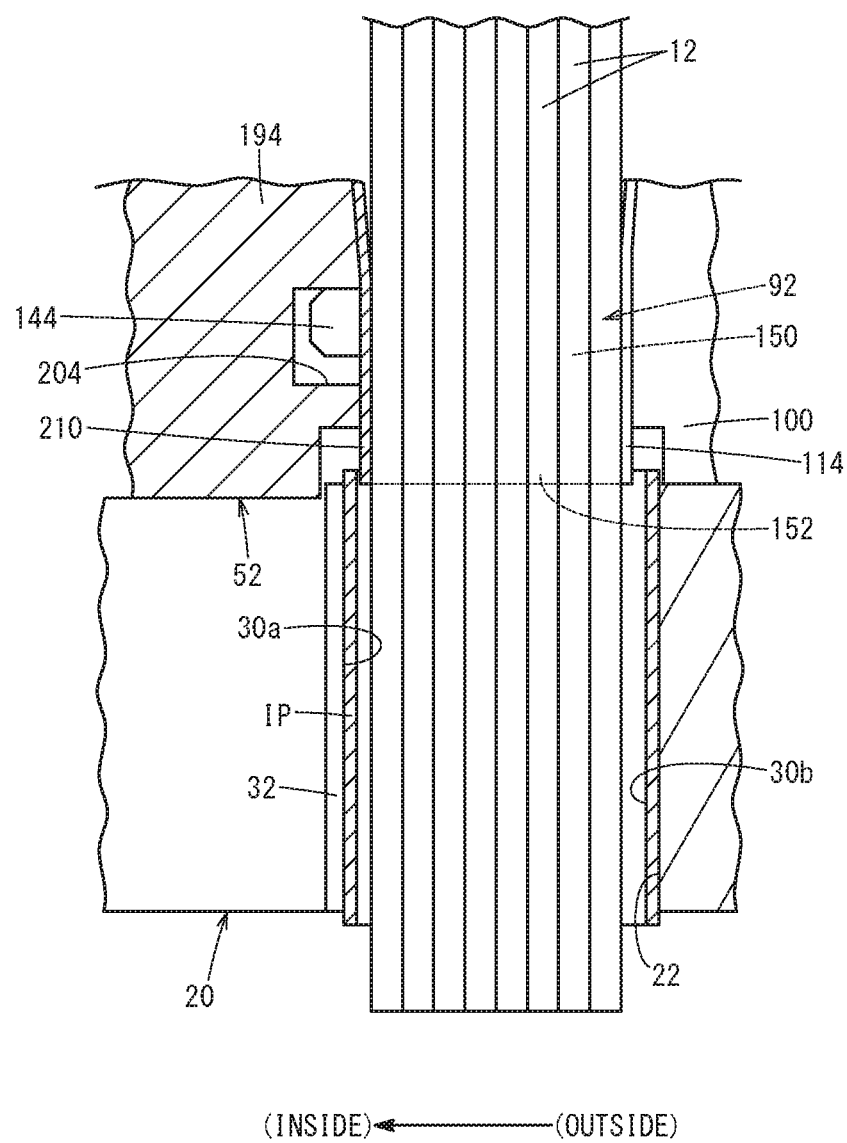
FIG. 16 is an enlarged cross-sectional view of essential parts showing a state in which the legs of the segments are inserted into the slot.

Next, as shown in FIG. 15, the clamp member is lowered, and the legs 12 of the plurality of segments 10 are simultaneously inserted into the internal spaces. Thereafter, when the clamp member releases the segments 10, as shown in FIG. 16, all of the legs 12 slide along the one-way guide members 210, the second long side guide sections 152, the second short side guide sections 114, and the first long side guide sections 150, and enter into predetermined slots 22. In this manner, according to the present embodiment, it is possible for all of the legs 12 to be inserted into the slots 22 in one operation. As noted previously, since the internal spaces become compressed toward the downward direction, even in the case that the legs 12 are slightly shifted in position relative to the slots 22, such positional displacement of the legs 12 is corrected, and the legs 12 are accurately guided into the slots 22. As can be understood by comparing FIGS. 15 and 16, when the legs 12 are inserted into the slots 22, the second short side guide sections 114 and the one-way guide members 210 are slightly bent elastically toward the outer side circumferential wall portion 194. Therefore, a clearance between the second short side guide sections 114 and the lower end of the block main body portion 100, and a clearance between the one-way guide members 210 and the lower end of the outer side circumferential wall portion 194, i.e., the relief space, is narrowed.

In this instance, the upper ends of the insulating papers IP are covered by the back surfaces of the one-way guide members 210, the second long side guide sections 152, the second short side guide sections 114, and the first long side guide sections 150, and are not exposed. Therefore, the legs 12 that have entered into the slots 22 are prevented from becoming caught on the insulating papers IP. Accordingly, the insulating papers IP are prevented from being pushed out from the slots 22 or becoming damaged due to receiving the pressure from the legs 12. More specifically, the insulating papers IP are reliably interposed between the legs 12 and the inner walls of the slots 22, and as a result, insulation is provided between the segments 10 and the stator core 20, and short circuiting is prevented.

Figure 13:
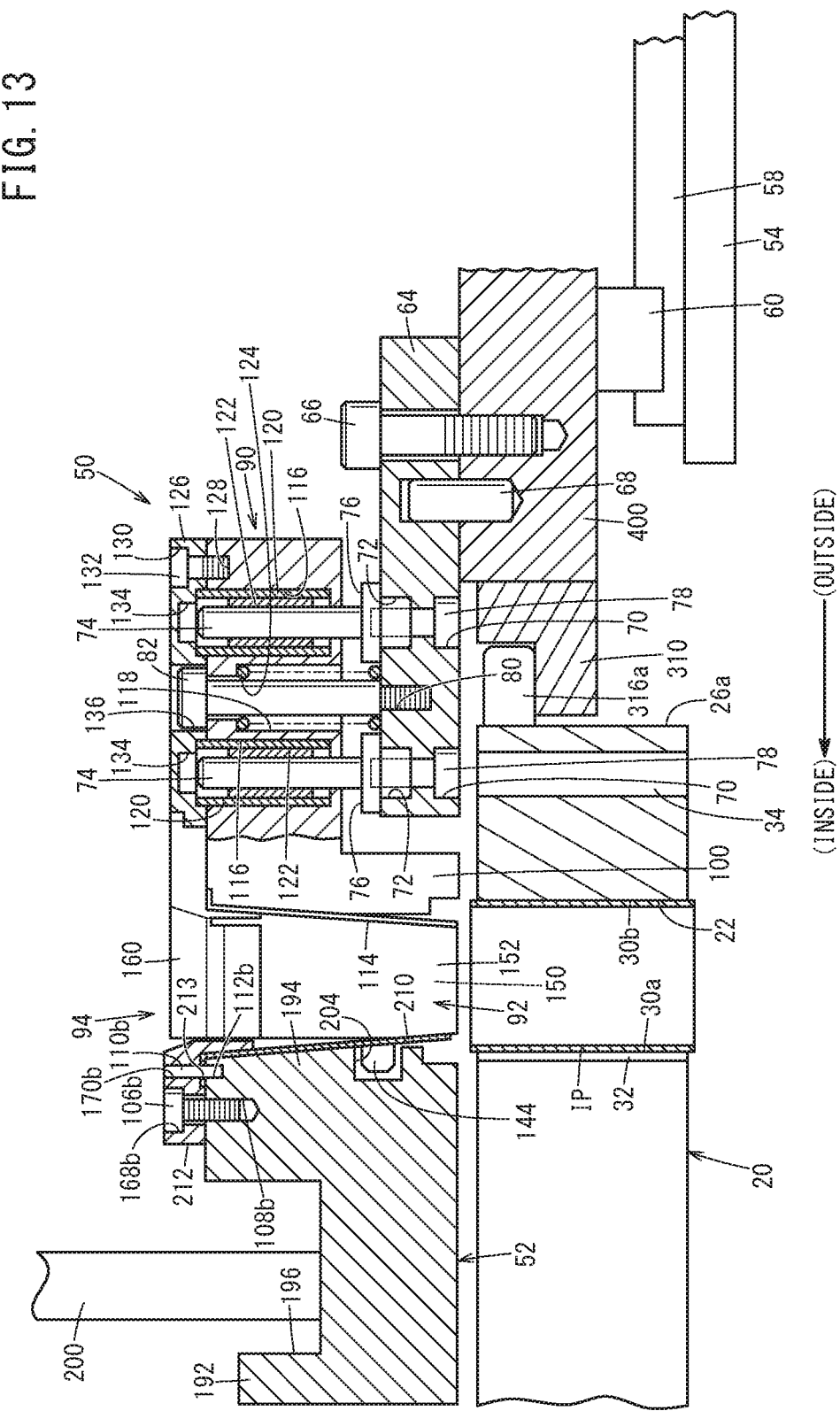
FIG. 13 is a side view of essential parts showing a state in which the slider unit included in the outer circumferential side guide member is displaced from the state shown in FIG. 4 toward the inner circumferential side guide member.

After the legs 12 have been inserted into the slots 22 in this manner, the clamp is raised upward, and next, the raising and lowering rod 200 is moved upward (see FIG. 13).

Accompanying such upward movement, the inner circumferential side guide member 52 ascends while being guided by the guiding bar 202, and the support block 90 follows and ascends integrally therewith. At this time, the coil springs 124 extend, and the slide guides 122 undergo sliding movement with respect to the guide rods 74. Due to being raised in this manner, the one-way guide sections 210, the second long side guide sections 152, the second short side guide sections 114, and the first long side guide sections 150 are raised in a manner so as to separate away from the slots 22.

Next, the servomotors 304 of the first through twelfth actuators 302a to 302l are energized to thereby retract the guide shafts 306 (see FIG. 2). Consequently, the first through twelfth slider units 406a to 406l are retracted so as to separate radially outward in the circumferential direction of the stator core 20, and the stator core 20 is released from the restraint of the driving sliders 400 (the engagement elements 310, the sub-engagement elements 312, and the pressing elements 314). Further, at this time, the engagement protrusions 144 are disengaged from the engagement recesses 204, and the connection between the inner circumferential side guide member 52 and the outer circumferential side guide member 50 is released. Stated otherwise, the system is returned to the state shown in FIG. 4.

The stator core 20 in which the legs 12 have been inserted into the slots 22 is transported to a station where a subsequent operation is to be carried out. In such a station, twisting of the segments 10 and mutual joining of the legs 12, etc., are carried out, and as a result, the stator ST shown in FIG. 17 is obtained.

Incidentally, when insertion (guidance) of the legs 12 into the slots 22 is performed repeatedly, for example, fatigue is accumulated in the bent portions 102 of the three-way guide members 92 and cracks are generated therein, which can be expected to lead to damage such as dropping off of the second long side guide sections 152 or the like. In the case that such a situation occurs, the operator may replace the three-way guide member 92 with a new product. At this time, the support block 90 may be removed from the driving slider 400, the first driven slider 402, or the second driven slider 404.

At first, the outer cap member 94 is removed (see FIG. 7). In order to do so, the operator may insert a driver into the bolt stopping holes 168a, and screw the two fastening bolts 106a in a direction to loosen them. After the fastening bolts 106a have been loosened, by the operator holding the outer cap member 94 with the fingers and pulling it upward, the outer cap member 94 is separated away from the support block 90 and the three-way guide member 92. At the same time, the bent portion 102 of the three-way guide member 92 is exposed.

Next, the operator grips the vicinity of the bent portion 102 with the fingers, and pulls the three-way guide member 92 upward. Consequently, the three-way guide member 92 separates away from the expanding portion 142.

Next, the operator grips a new three-way guide member 92 with the fingers, and places the first long side guide section 150, the bent portion 102, and the second long side guide section 152 thereof on the expanding portion 142. Further, the second short side guide section 114 is placed on the upper surface, i.e., the outer circumferentially directed side guide section mounting member, of the support block 90. Due to being mounted as described above, the three-way guide member 92 is supported by the support block 90, and positioning of the first long side guide section 150, the bent portion 102, and the second long side guide section 152 is performed.

In this manner, according to the present embodiment, the three-way guide member 92 is capable of being supported on the support block 90 without the use of bolts, an adhesive, or the like. Therefore, the operation of attaching or detaching the three-way guide member 92 to and from the support block 90 is facilitated.

Next, the operator grips the outer cap member 94 and presses the outer cap member 94 in a manner so that the bent portion 102 is press-inserted into the insertion groove 164 that is formed in the bent portion sandwiching part 160. In the case that the intersecting angle (bending angle of the bent portion 102) between the first long side guide section 150 and the second long side guide section 152 is greater than the intersecting angle of the inclined surfaces of the expanding portion 142, upon press-insertion thereof, the first long side guide section 150 and the second long side guide section 152 are pressed by the two side walls inside the insertion groove 164, and are corrected so as to conform to the expanding portion 142. Therefore, it becomes more difficult for the first long side guide section 150 and the second long side guide section 152 to drop off from the expanding portion 142.

When the bent portion 102 is inserted into the insertion groove 164, the second short side guide section sandwiching part 162 sandwiches the second short side guide section 114 together with the outer circumferentially directed side guide section mounting member. Due to being sandwiched and gripped in this manner, the second short side guide section 114 is positioned and fixed in place, and is firmly supported by the support block 90.

In the foregoing manner, according to the present embodiment, the three-way guide member 92 can be stably supported on the support block 90 by the outer cap member 94 which is a single member. Therefore, since the number of parts is reduced, mounting of the three-way guide member 92 on the support block 90 can be made easier in comparison with a case in which a large number of members are used.

Thereafter, the operator inserts a driver into the bolt stopping holes 168a and screws the two fastening bolts 106a in a direction to fasten them. By screw-engagement of the fastening bolts 106a in the bolt fastening holes 108a, the outer cap member 94 is connected to the support block 90 in a state with the three-way guide member 92 being sandwiched therebetween.

Moreover, when the one-way guide member 210 becomes damaged, the fastening bolts 106b may be loosened by a driver that is inserted into the bolt stopping holes 168b, and the inner cap member 212 and the one-way guide member 210 may be removed from the outer side circumferential wall portion 194. Thereafter, the positioning pins 110b are passed through the pin passage holes 213 of the one-way guide member 210 of a new product, and by screwing the fastening bolts 106b into the bolt fastening holes 108b, the one-way guide member 210 is firmly sandwiched and gripped between the outer side circumferential wall portion 194 and the inner cap member 212.

In this manner, according to the present embodiment, when the three-way guide member 92 or the one-way guide member 210 is exchanged or replaced, there is no need to insert a hand or a finger from the side. Specifically, there is no need for an operator to perform operations within a narrow space, and therefore, the three-way guide member 92 or the one-way guide member 210 can be easily replaced in a natural posture.

The present invention is not limited in particular to the embodiment described above, and various modifications thereto are possible within a range that does not depart from the essence and gist of the present invention.

For example, the second short side guide section 114 may be formed so as to approach toward the same slot 22 as the first long side guide section 150 of the three-way guide member 92 having the second short side guide section 114.

Further, the actuator may be a cylinder or a ball screw mechanism.

Furthermore, a lower end of the one-way guide member 210 and a lower end of the three-way guide member 92 may be configured in a manner so as to be made to enter into the slot 22.

What is claimed is:

1. An electric conductor insertion device configured to insert predetermined portions of electric conductors with respect to slots which are formed in plurality in a stator core, together with being formed in linear shapes including diametrically directed sides extending along diametrical directions of the stator core, and circumferential sides extending along a circumferential direction of the stator core, and in which insulating papers are respectively arranged, the electric conductor insertion device comprising:
    a guide member configured to guide the predetermined portions of the electric conductors into the slots; and
    a supporting body configured to support the guide member;
    wherein, by a single member being bent at a bent portion, the guide member includes a first diametrically directed side guide section adapted to guide the predetermined portions of the electric conductors on a diametrically directed side of a first slot, and a second diametrically directed side guide section adapted to guide the predetermined portions of the electric conductors on a diametrically directed side of a second slot adjacent to the first slot, together with the first diametrically directed side guide section and the second diametrically directed side guide section forming an inverted V-shape with the bent portion forming an apex thereof, and the bent portion is supported by the supporting body,
    wherein the first diametrically directed side guide section, at a time of approaching toward the first slot, presses the insulating paper inside the first slot toward an inner wall side of the diametrically directed sides of the first slot, and the second diametrically directed side guide section, at a time of approaching toward the second slot, presses the insulating paper inside the second slot toward an inner wall side of the diametrically directed sides of the second slot;
    further comprising a second supporting body, wherein the second supporting body includes an inner circumferentially directed side guide section adapted to guide the predetermined portions of the electric conductors on a circumferentially directed side of an inner circumference of the second slot.

2. The insertion device according to claim 1, wherein the guide member further includes an outer circumferentially directed side guide section adapted to guide the predetermined portions of the electric conductors on a circumferentially directed side of an outer circumferential side of the second slot.

3. The insertion device according to claim 1, wherein a first engagement part is provided on the second supporting body, and a second engagement part that engages with the first engagement part is provided on the supporting body, and further comprising a supporting body displacement mechanism adapted to cause the second supporting body and the supporting body, which are connected together mutually by engagement of the first engagement part and the second engagement part, to be displaced together integrally.

4. The insertion device according to claim 1, wherein the supporting body is formed in an inverted V-shape, and includes a bent portion mounting member on which the bent portion of the guide member is mounted.

5. The insertion device according to claim 4, further comprising a member including a bent portion sandwiching part adapted to sandwich, together with the bent portion mounting member, the bent portion that is mounted on the bent portion mounting member.

6. The insertion device according to claim 2, wherein an outer circumferentially directed side guide section mounting member on which the outer circumferentially directed side guide section is mounted is provided on the supporting body, and further comprising a member including an outer circumferentially directed side guide section sandwiching part adapted to sandwich, together with the outer circumferentially directed side guide section mounting member, the outer circumferentially directed side guide section that is mounted on the outer circumferentially directed side guide section mounting member.

7. The insertion device according to claim 4, wherein an outer circumferentially directed side guide section mounting member on which the outer circumferentially directed side guide section is mounted is provided on the supporting body, and further wherein:
    there are provided integrally on a single member:
    an outer circumferentially directed side guide section sandwiching part adapted to sandwich, together with the outer circumferentially directed side guide section mounting member, the outer circumferentially directed side guide section that is mounted on the outer circumferentially directed side guide section mounting member; and
    a bent portion sandwiching part adapted to sandwich, together with the bent portion mounting member, the bent portion that is mounted on the bent portion mounting member.

* * * * *